(12) United States Patent
Sengupta et al.

(10) Patent No.: US 12,035,263 B2
(45) Date of Patent: Jul. 9, 2024

(54) DEDICATED UNICAST TRANSMISSION OF SATELLITE LOCATION INFORMATION

(71) Applicant: QUALCOMM Incorporated, San Diego, CA (US)

(72) Inventors: Ayan Sengupta, San Diego, CA (US); Le Liu, Fremont, CA (US); Alberto Rico Alvarino, San Diego, CA (US); Xiao Feng Wang, San Diego, CA (US); Mungal Singh Dhanda, Slough (GB); Jun Ma, San Diego, CA (US); Peter Gaal, San Diego, CA (US); Bharat Shrestha, San Diego, CA (US); Liangping Ma, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/220,893

(22) Filed: Apr. 1, 2021

(65) Prior Publication Data

US 2022/0322263 A1 Oct. 6, 2022

(51) Int. Cl.
*H04W 56/00* (2009.01)
*H04B 7/185* (2006.01)
(Continued)

(52) U.S. Cl.
CPC .... *H04W 56/0035* (2013.01); *H04B 7/18519* (2013.01); *H04W 56/004* (2013.01); *H04W 72/21* (2023.01)

(58) Field of Classification Search
CPC ........... H04W 56/0035; H04W 56/004; H04W 72/0413; H04B 7/18519
See application file for complete search history.

(56) References Cited

U.S. PATENT DOCUMENTS 9,973,266 B1 * 5/2018 Avellan ............... H04B 7/18519
10,826,595 B2 * 11/2020 Wang .................. H04W 52/285
(Continued)

FOREIGN PATENT DOCUMENTS

EP          3910993 A1   11/2021
KR     20200086623 A    7/2020

OTHER PUBLICATIONS

International Search Report and Written Opinion—PCT/US2022/018943—ISA/EPO—dated Sep. 21, 2022 (2103185WO).
(Continued)

*Primary Examiner* — Bailor C Hsu
(74) *Attorney, Agent, or Firm* — Holland & Hart LLP

(57) ABSTRACT

Methods, systems, and devices for wireless communications are described in which UEs may communicate with satellites or base stations, or both in a non-terrestrial network. Due to large distances between transmitting devices and receiving devices in a non-terrestrial network, the UE may account for propagation delay and frequency shift of communications with a satellite based on location information of the satellite. The UE may receive first satellite location information from a base station or a satellite, via a broadcast message. The UE may receive second satellite location information from the wireless network node via a unicast message, where both the first satellite location information and the second satellite location information relate to a same satellite. The UE may transmit an uplink communication via the satellite based on at least one of the first satellite location information or the second satellite location information.

41 Claims, 17 Drawing Sheets

(51) Int. Cl.
*H04W 72/04* (2023.01)
*H04W 72/21* (2023.01)

(56) References Cited

U.S. PATENT DOCUMENTS

| | | | | |
|---|---|---|---|---|
| 11,800,479 | B2* | 10/2023 | Leng | H04B 7/1851 |
| 2010/0157880 | A1* | 6/2010 | Kim | H04B 7/18589 |
| | | | | 370/316 |
| 2010/0234022 | A1* | 9/2010 | Winterbottom | H04W 4/029 |
| | | | | 455/433 |
| 2011/0256865 | A1* | 10/2011 | Sayeed | H04B 7/18589 |
| | | | | 455/427 |
| 2012/0009939 | A1* | 1/2012 | Islam | H04W 64/00 |
| | | | | 455/456.1 |
| 2012/0146849 | A1* | 6/2012 | Xu | G01S 19/27 |
| | | | | 342/357.29 |
| 2013/0342393 | A1* | 12/2013 | O'Connor | G01S 19/28 |
| | | | | 342/357.25 |
| 2015/0270890 | A1* | 9/2015 | Vasavada | H04B 7/195 |
| | | | | 370/326 |
| 2016/0278033 | A1* | 9/2016 | Wu | H04W 56/0015 |
| 2017/0085329 | A1* | 3/2017 | Ravishankar | H04W 72/0453 |
| 2017/0276792 | A1* | 9/2017 | Gao | G01S 19/08 |
| 2017/0288830 | A1* | 10/2017 | Fischer | H04W 72/042 |
| 2017/0353228 | A1* | 12/2017 | Watson | H04B 7/0825 |
| 2018/0324740 | A1* | 11/2018 | Edge | H04W 12/0431 |
| 2018/0376393 | A1* | 12/2018 | Wu | H04W 72/0446 |
| 2019/0037338 | A1* | 1/2019 | Edge | H04W 4/20 |
| 2019/0053051 | A1* | 2/2019 | Yu | H04L 61/00 |
| 2019/0238216 | A1* | 8/2019 | Avellan | H04B 7/024 |
| 2019/0260462 | A1* | 8/2019 | Axmon | H04B 7/18506 |
| 2019/0313357 | A1 | 10/2019 | Wang et al. | |
| 2019/0394770 | A1 | 12/2019 | Wang et al. | |
| 2020/0036435 | A1* | 1/2020 | Ravishankar | H04B 7/18515 |
| 2020/0313755 | A1* | 10/2020 | Chuang | H04B 7/1855 |
| 2021/0185739 | A1* | 6/2021 | Prabhakar | H04W 4/027 |
| 2021/0281520 | A1* | 9/2021 | Shrestha | H04L 47/283 |
| 2021/0297147 | A1* | 9/2021 | Qaise | H04W 84/06 |
| 2021/0313707 | A1* | 10/2021 | Wang | H01Q 21/24 |
| 2022/0007323 | A1* | 1/2022 | Li | H04B 7/1851 |
| 2022/0070811 | A1* | 3/2022 | Tripathi | H04B 7/1851 |
| 2023/0188206 | A1* | 6/2023 | Arnaud | H04B 7/18573 |
| | | | | 455/427 |
| 2023/0194649 | A1* | 6/2023 | Thomas | G01S 5/0246 |
| | | | | 370/252 |

OTHER PUBLICATIONS

Partial International Search Report—PCT/US2022/018943—ISA/EPO—dated Jun. 17, 2022 (2103185WO).

Sony: "Discussion on Uplink Timing Advance and RACH Procedure", 3GPP Draft, 3GPP TSG RAN WG1 #98, R1-1908775, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019 (Aug. 17, 2019), XP051765383, 4 Pages, Retrieved from the Internet: URL: http://www.3gpp.org/ftp/tsg_ran/WG1_RL1/TSGR1_98/Docs/R1-1908775.zip. [retrieved on Aug. 17, 2019] section 2, section 2.1, section 2.2, pp. 1-3, the whole document.

* cited by examiner

DEDICATED UNICAST TRANSMISSION OF SATELLITE LOCATION INFORMATION

INTRODUCTION

The following relates to wireless communications, and more specifically to managing transmission of satellite location information.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a user equipment (UE) is described. The method may include receiving first satellite location information from a wireless network node via a broadcast message and receiving second satellite location information from the wireless network node via a unicast message. In some examples, both the first satellite location information and the second satellite location information may pertain to a same satellite. The method may also include transmitting an uplink communication via the satellite based on at least one of the first satellite location information or the second satellite location information.

An apparatus for wireless communication at a UE is described. The apparatus may include a processor, memory coupled to the processor, the processor and memory configured to receive first satellite location information from a wireless network node via a broadcast message and receive second satellite location information from the wireless network node via a unicast message. In some examples, both the first satellite location information and the second satellite location information pertain to a same satellite. The processor and memory may also be configured to transmit an uplink communication via the satellite based on at least one of the first satellite location information or the second satellite location information.

Another apparatus for wireless communication at a UE is described. The apparatus may include means for receiving first satellite location information from a wireless network node via a broadcast message and means for receiving second satellite location information from the wireless network node via a unicast message. In some examples, both the first satellite location information and the second satellite location information pertain to a same satellite. The apparatus may also include means for transmitting an uplink communication via the satellite based on at least one of the first satellite location information or the second satellite location information.

A non-transitory computer-readable medium storing code for wireless communication at a UE is described. The code may include instructions executable by a processor to receive first satellite location information from a wireless network node via a broadcast message and receive second satellite location information from the wireless network node via a unicast message. In some examples, both the first satellite location information and the second satellite location information pertain to a same satellite. The code may also include instructions executable by a processor to and transmit an uplink communication via the satellite based on at least one of the first satellite location information or the second satellite location information.

Some examples of the method, apparatuses, and non-transitory computer-readable medium described herein may further include operations, features, means, or instructions for receiving the second satellite location information during a connection setup procedure with the wireless network node.

Some examples of the method, apparatuses, and non-transitory computer-readable medium described herein may further include operations, features, means, or instructions for receiving, from the wireless network node, downlink control information scheduling a physical downlink shared channel that includes the second satellite location information.

Some examples of the method, apparatuses, and non-transitory computer-readable medium described herein may further include operations, features, means, or instructions for receiving, from the wireless network node, downlink control information scheduling an uplink grant for transmitting the uplink communication and a downlink grant, the downlink grant preceding the uplink grant and including the second satellite location information.

Some examples of the method, apparatuses, and non-transitory computer-readable medium described herein may further include operations, features, means, or instructions for receiving, from the wireless network node, downlink control information including the second satellite location information.

Some examples of the method, apparatuses, and non-transitory computer-readable medium described herein may further include operations, features, means, or instructions for receiving the second satellite location information via a configured grant or a semi-persistent scheduling downlink grant, or both.

Some examples of the method, apparatuses, and non-transitory computer-readable medium described herein may further include operations, features, means, or instructions for receiving the second satellite location information via a preconfigured uplink resource configuration message.

Some examples of the method, apparatuses, and non-transitory computer-readable medium described herein may further include operations, features, means, or instructions for transmitting a preconfigured uplink resource message, the receiving the second satellite location information including receiving the second satellite location information in response to transmitting the preconfigured uplink resource message.

Some examples of the method, apparatuses, and non-transitory computer-readable medium described herein may further include operations, features, means, or instructions for determining, based on at least one of the first satellite location information or the second satellite location information, an uplink timing, an uplink frequency, or both, for transmitting the uplink communication via the satellite.

Some examples of the method, apparatuses, and non-transitory computer-readable medium described herein may further include operations, features, means, or instructions for determining that the UE may be in an idle mode, where the uplink timing, the uplink frequency, or both may be determined based on the first satellite location information.

Some examples of the method, apparatuses, and non-transitory computer-readable medium described herein may further include operations, features, means, or instructions for determining that the UE may be in a connected mode, where the uplink timing, the uplink frequency, or both may be determined based on the second satellite location information.

Some examples of the method, apparatuses, and non-transitory computer-readable medium described herein may further include operations, features, means, or instructions for determining whether to use the first satellite location information or the second satellite location information to determine the uplink timing, the uplink frequency, or both based on one or more of an accuracy of the first satellite location information, an accuracy of the second satellite location information, a timing of the first satellite location information, a timing of the second satellite location information, or a combination thereof.

In some examples of the method, apparatuses, and non-transitory computer-readable medium described herein, the wireless network node includes a base station or the satellite.

In some examples of the method, apparatuses, and non-transitory computer-readable medium described herein, the UE includes an internet of things (IoT) UE or an enhanced machine-type communication UE.

A method for wireless communication at a wireless network node is described. The method may include transmitting a first satellite location information to a UE via a broadcast message and transmitting a second satellite location information to the UE via a unicast message. In some examples, both the first satellite location information and the second satellite location information pertain to a same satellite. The method may also include receiving an uplink communication based on at least one of the first satellite location information or the second satellite location information.

An apparatus for wireless communication at a wireless network node is described. The apparatus may include a processor, memory coupled with the processor, the processor and memory configured to transmit a first satellite location information to a UE via a broadcast message and transmit a second satellite location information to the UE via a unicast message. In some examples, both the first satellite location information and the second satellite location information pertain to a same satellite. The processor and memory may also be configured to receive an uplink communication based on at least one of the first satellite location information or the second satellite location information.

Another apparatus for wireless communication at a wireless network node is described. The apparatus may include means for transmitting a first satellite location information to a UE via a broadcast message and means for transmitting a second satellite location information to the UE via a unicast message. In some examples, both the first satellite location information and the second satellite location information pertain to a same satellite. The apparatus may also include means for receiving an uplink communication based on at least one of the first satellite location information or the second satellite location information.

A non-transitory computer-readable medium storing code for wireless communication at a wireless network node is described. The code may include instructions executable by a processor to transmit a first satellite location information to a UE via a broadcast message and transmit a second satellite location information to the UE via a unicast message. In some examples, both the first satellite location information and the second satellite location information pertain to a same satellite. The code may also include instructions executable by a processor to receive an uplink communication based on at least one of the first satellite location information or the second satellite location information.

Some examples of the method, apparatuses, and non-transitory computer-readable medium described herein may further include operations, features, means, or instructions for transmitting the second satellite location information during a connection setup procedure with the UE.

Some examples of the method, apparatuses, and non-transitory computer-readable medium described herein may further include operations, features, means, or instructions for transmitting, to the UE, downlink control information scheduling a physical downlink shared channel that includes the second satellite location information.

Some examples of the method, apparatuses, and non-transitory computer-readable medium described herein may further include operations, features, means, or instructions for transmitting, to the UE, downlink control information scheduling an uplink grant for receiving the uplink communication and a downlink grant, the downlink grant preceding the uplink grant and including the second satellite location information.

Some examples of the method, apparatuses, and non-transitory computer-readable medium described herein may further include operations, features, means, or instructions for transmitting, to the UE, downlink control information including the second satellite location information.

Some examples of the method, apparatuses, and non-transitory computer-readable medium described herein may further include operations, features, means, or instructions for transmitting the second satellite location information via a periodic configured grant, or a semi-persistent scheduling downlink grant, or both.

Some examples of the method, apparatuses, and non-transitory computer-readable medium described herein may further include operations, features, means, or instructions for transmitting the second satellite location information via a preconfigured uplink resource configuration message.

Some examples of the method, apparatuses, and non-transitory computer-readable medium described herein may further include operations, features, means, or instructions for receiving a preconfigured uplink resource message, the transmitting the second satellite location information including transmitting the second satellite location information in response to receiving the preconfigured uplink resource message.

Some examples of the method, apparatuses, and non-transitory computer-readable medium described herein may further include operations, features, means, or instructions for receiving the uplink communication may be further based on an uplink timing, an uplink frequency or both determined based on the first satellite location information or the second satellite location information.

A method for wireless communication at a UE is described. The method may include transmitting, to a wireless network node, a capability indication including at least one of UE mobility information, a periodicity for the UE to participate in a satellite-assisted UE location determination, a timing associated with the satellite-assisted UE location determination, or any combination thereof. The method may also include communicating with the wireless network node based on the capability indication.

An apparatus for wireless communication at a UE is described. The apparatus may include a processor, memory coupled with the processor, the processor and memory configured to transmit, to a wireless network node, a capability indication including at least one of UE mobility information, a periodicity for the UE to participate in a satellite-assisted UE location determination, a timing associated with the satellite-assisted UE location determination, or any combination thereof. The processor and memory may also be configured to communicate with the wireless network node based on the capability indication.

Another apparatus for wireless communication at a UE is described. The apparatus may include means for transmitting, to a wireless network node, a capability indication including at least one of UE mobility information, a periodicity for the UE to participate in a satellite-assisted UE location determination, a timing associated with the satellite-assisted UE location determination, or any combination thereof. The apparatus may also include means for communicating with the wireless network node based on the capability indication.

A non-transitory computer-readable medium storing code for wireless communication at a UE is described. The code may include instructions executable by a processor to transmit, to a wireless network node, a capability indication including at least one of UE mobility information, a periodicity for the UE to participate in a satellite-assisted UE location determination, a timing associated with the satellite-assisted UE location determination, or any combination thereof. The code may also include instructions executable by a processor to communicate with the wireless network node based on the capability indication.

In some examples of the method, apparatuses, and non-transitory computer-readable medium described herein, the capability indication may be transmitted as part of a UE capability message.

In some examples of the method, apparatuses, and non-transitory computer-readable medium described herein, the UE mobility information indicates that the UE may be a fixed UE or a mobile UE.

In some examples of the method, apparatuses, and non-transitory computer-readable medium described herein, the UE includes an IoT UE or an enhanced machine-type communication UE.

In some examples of the method, apparatuses, and non-transitory computer-readable medium described herein, the satellite-assisted UE location determination may be based on a global navigation satellite system (GNSS) or a global positioning system (GPS) or both and the wireless network node may include a serving satellite or a serving base station in a non-terrestrial network.

DETAILED DESCRIPTION

Figure 1:
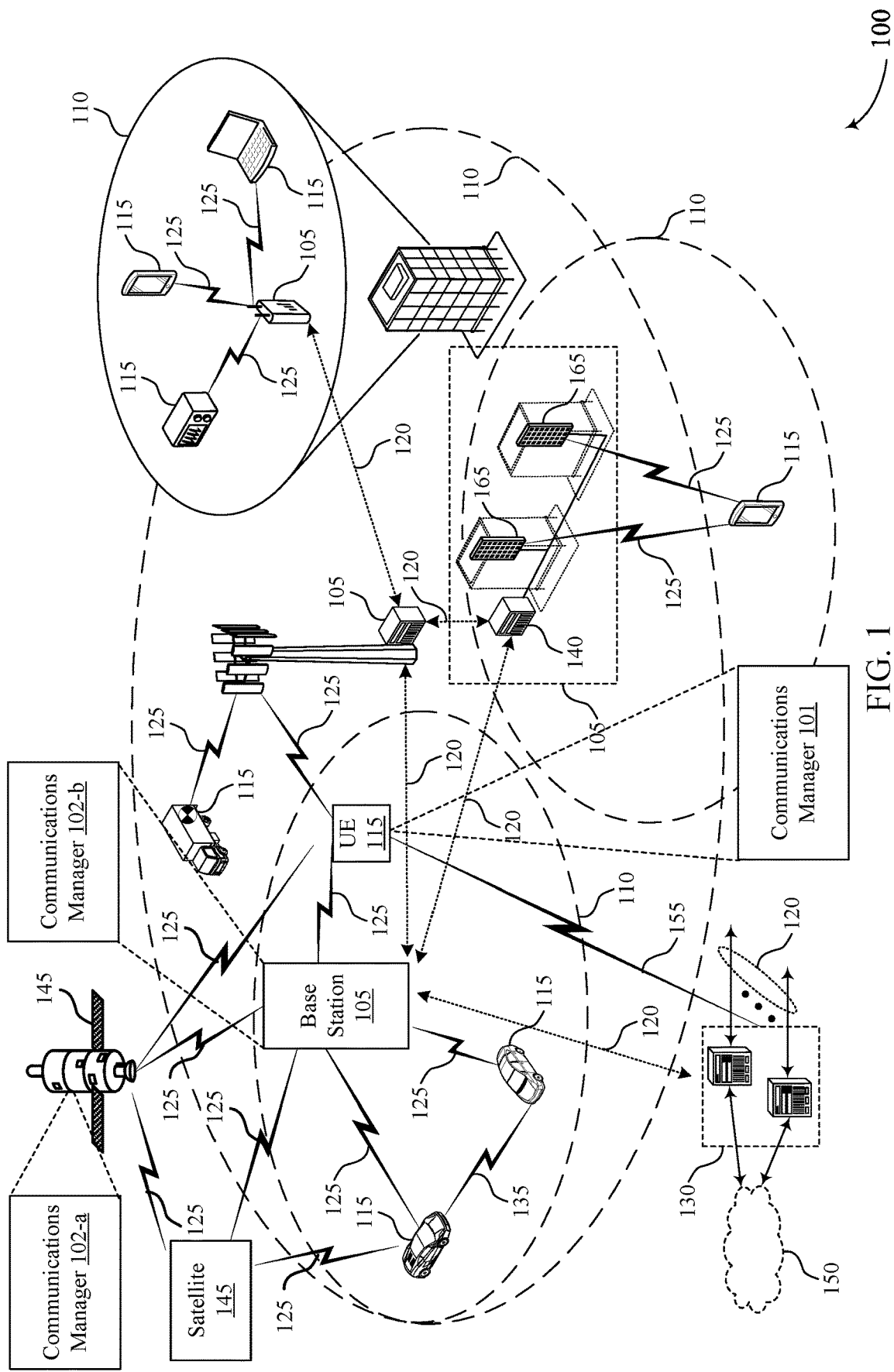
FIG. 1 illustrates an example of a wireless communications system that supports dedicated unicast transmission of satellite location information in accordance with one or more aspects of the present disclosure.

In wireless communications systems supporting non-terrestrial networks, a distance between a base station and a satellite may be large. Thus, it may take a long time for electromagnetic waves to propagate over the distance between the gateway (e.g., base station) and the satellite and between the satellite and the UE. Thus, the propagation delay for non-terrestrial networks may be many orders of magnitude larger than the propagation delay for terrestrial networks. As such, the propagation delay associated with a signal may also be greater for non-terrestrial networks than for terrestrial networks. Further, due to the high mobility of high-altitude vehicles such as non-geostationary satellites, communications with such high-altitude vehicles may promote large frequency shifts (e.g., Doppler shifts) associated with communications in a non-terrestrial network. Variations in propagation delay and frequency shift (e.g., Doppler shift) may cause UEs (e.g., user terminals) to experience variation in uplink timing and frequency synchronization with satellites. In non-terrestrial networks, a UE may use a location of the satellite in order to pre-compensate or account for propagation delay and frequency shifts (e.g., Doppler shifts) during uplink transmissions to the satellite.

In some wireless communications systems, the satellite or a ground-based base station may broadcast location information of the satellite to the UE. For example, a satellite may periodically transmit location information (e.g., ephemeris, position, velocity, time (PVT) information, etc.) to UEs in the associated non-terrestrial network via broadcast channels. The accuracy of location information at the UE may be based on how often a satellite communicates the satellite location information to the UE. In some examples, the satellite location information may be carried via system information block (SIB) and a satellite location accuracy may be based on or may be a function of how frequently the SIB is transmitted via broadcast. However, frequent transmission of the satellite location information via SIB may be inefficient and may cause a UE to wake up unnecessarily. For example, the UE may wake up to receive the satellite location information even when the UE has no information to communicate via uplink. In some other examples, a periodically transmitted SIB may collide with a scheduled uplink transmission. Thus, one or more aspects of the present disclosure support techniques for unicast transmission of satellite location information to non-terrestrial network UEs.

As described herein, UEs, base stations or gateways, and satellites may support dedicated unicast transmission of satellite location information. For example, a base station or a satellite may transmit satellite location information via dedicated (e.g., UE-specific) unicast signaling. In some examples, the unicast transmission of satellite location information may be in addition to broadcast signaling of satellite location information. For example, the broadcast transmission may be used for UEs that are in the process of acquiring a cell while in an idle mode. However, while operating in a connected mode, the UE may, in some cases, rely on dedicated unicast transmission of satellite location information. As such, the UE may reduce a number of times it wakes-up to receive satellite location information when the UE has no information for uplink transmission. As such, UEs, may utilize the techniques described herein to experience power saving, such as extended battery life while ensuring reliable communications. For example, unicast transmission of satellite location information may provide time and power saving while increasing reliability.

Aspects of the disclosure are initially described in the context of wireless communications systems. Aspects of the disclosure are also illustrated by a process flow diagram. Aspects of the disclosure are further illustrated by and described with reference to apparatus diagrams, system diagrams, and flowcharts that relate to dedicated unicast transmission of satellite location information.

FIG. 1 illustrates an example of a wireless communications system 100 that supports dedicated unicast transmission of satellite location information in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an IoT device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 165, which may be referred to as radio heads, smart radio heads, or transmission/reception points (TRPs). Each access network transmission entity 165 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FRE or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming.

The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Wireless communications system 100 may also include one or more satellites 145. Satellite 145 may communicate with base stations 105 (also referred to as gateways in non-terrestrial networks) and UEs 115 (or other high altitude or terrestrial communications devices). Satellite 145 may be any suitable type of communication satellite configured to relay communications between different end nodes in a wireless communication system. Satellite 145 may be an example of a space satellite, a balloon, a dirigible, an airplane, a drone, an unmanned aerial vehicle, and/or the like. In some examples, the satellite 145 may be in a geosynchronous or geostationary earth orbit, a low earth orbit or a medium earth orbit. A satellite 145 may be a multi-beam satellite configured to provide service for multiple service beam coverage areas in a predefined geographical service area. The satellite 145 may be any distance away from the surface of the earth.

In some cases, a cell may be provided or established by a satellite 145 as part of a non-terrestrial network. A satellite 145 may, in some cases, perform the functions of a base station 105, act as a bent-pipe satellite, or may act as a regenerative satellite, or a combination thereof. In other cases, satellite 145 may be an example of a smart satellite, or a satellite with intelligence. For example, a smart satellite may be configured to perform more functions than a regenerative satellite (e.g., may be configured to perform particular algorithms beyond those used in regenerative satellites, may be configured to be reprogrammed, etc.). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., satellite 145) may receive a signal from a base station 105 and may relay the signal to a UE 115 or base station 105, or vice-versa.

UEs 115 may communicate with satellites 145 and/or base stations 105 using communication links 125. In some cases, a communications manager 101 may be included in a device to support unicast transmission of satellite location information. For example, a UE 115 may include a communications manager 101 and a satellite 145 may include a communications manager 102-*a* or a base station 105 may include a communications manager 102-*b*.

In some cases, timing adjustments or frequency adjustments may account for propagation delay or Doppler shifts that may affect communications between the UE 115 and the satellite 145. For example, communication links 125 between UE 115 and satellite 145 or between UE 115 and base station 105 via a satellite 145 may include a propagation delay or Doppler shift between a UE 115 and a satellite 145, or a propagation delay or a Doppler shift between a base station 105 and a satellite 145, or both, as well as a variation in the propagation delays due to movement of the satellite. In accordance with various techniques discussed herein, a UE 115 may account for propagation delay, or Doppler shift, or both based on location information of the satellite 145. For example, communications manager 101 may receive, from communications manager 102-*a* or communications manager 102-*b*, first satellite location information via a broadcast message. In some examples, the broadcast massage may be transmitted periodically. The communications manager 101 may receive second satellite location information from the communications manager 102-*a* or the communications manager 102-*b*, via a unicast message, where both the first satellite location information and the second satellite location information relate to the satellite 145 but may each be associated with its location at different times. The communications manager 101 may determine an uplink timing or an uplink frequency to compensate for propagation delay or Doppler shift based on the first satellite location information or the second satellite location information. The communications manager 101 may transmit an uplink communication via the satellite based on the uplink timing or frequency, or both.

Figure 2:
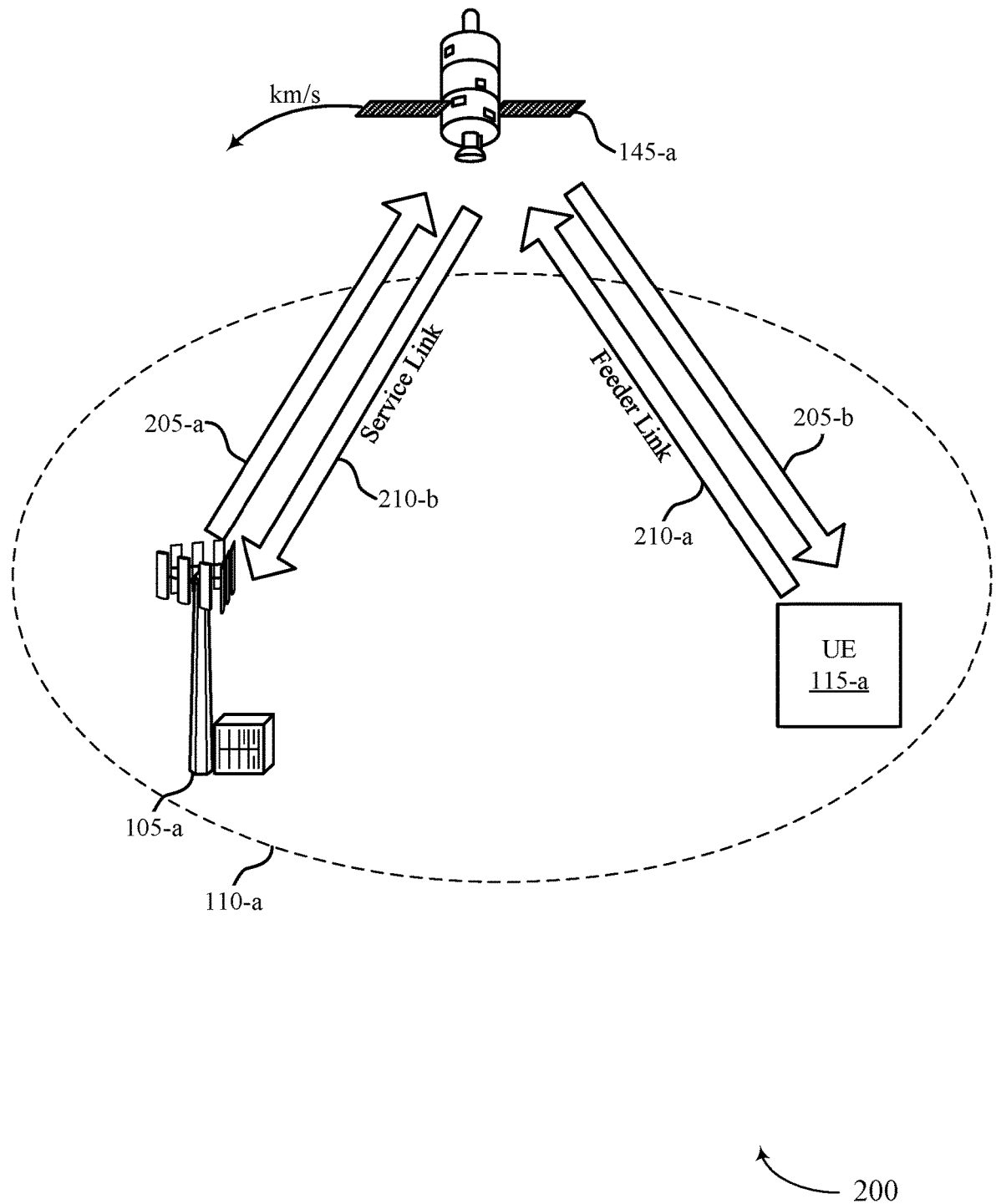
FIG. 2 illustrates an example of a wireless communications system that supports dedicated unicast transmission of satellite location information in accordance with one or more aspects of the present disclosure.

FIG. 2 illustrates an example of a wireless communications system 200 that supports dedicated unicast transmission of satellite location information in accordance with one or more aspects of the present disclosure. In some examples, the wireless communications system 200 may implement aspects of wireless communications system 100. The wireless communications system 200 may include a base station 105-*a*, a UE 115-*a*, and a satellite 145-*a*, which may be examples of a base station 105, UEs 115, and satellites 145 as described with reference to FIG. 1. Base station 105-*a* may be an example of a serving base station 105-*a* for UE 115-*a*. Although not depicted herein, other base stations may be examples of neighboring base stations 105 and may be present in the wireless communications system 200. The base station 105-*a* may serve a coverage area 110-*a* in examples of a terrestrial network, and the satellite 145-*a* may serve coverage area 110-*a* in examples of a non-terrestrial network.

Non-terrestrial networks (e.g., wireless communications system 200) may provide coverage by using high-altitude vehicles between user terminals and base stations (e.g., next-generation NodeBs or giga-NodeBs (which may be referred to as a gNB, and also referred to as access stations or access gateways)). A base station may, for example, transmit data to a satellite which may then be relayed to a user terminal or vice-versa. A satellite, in some examples, may perform the functions of a base station. Additionally or alternatively, the base station may be a terrestrial-based gateway that communicates with a UE via the satellite. A user terminal may be any device capable of transmitting signals to a satellite. Examples of a user terminal may include a UE, a relay equipment configured to relay a signal between a satellite and a user terminal, or a combination thereof. Non-terrestrial networks may involve the use of high altitude platform stations (HAPSs) and/or satellites to provide coverage for terrestrial base stations and UEs. The terms HAPS and satellite are used interchangeably herein to refer to a remote non-terrestrial network device that may provide coverage to one or more other high altitude or terrestrial devices. Likewise, the terms gateway and base station are used interchangeably herein to refer to a network node that serves a UE and provides network access to the UE.

In the example of FIG. 2, the satellite 145-*a* may relay communications between the base station 105-*a* and the UE 115-*a*. For example, the base station 105-*a* may communicate with the UE 115-*a* via the satellite 145-*a* or vice-versa. In some examples, for communications originating at the base station 105-*a* and going to the UE 115-*a*, the base station 105-*a* may transmit an uplink transmission 205-*a* to the satellite 145-*a*, which may be referred to as a service link. The satellite 145-*a* may relay the uplink transmission 205-*a* as a downlink transmission 205-*b* to the UE 115-*a*, which may be referred to as a feeder link. In other examples, for communications originating at the UE 115-*a* and going to the base station 105-*a*, the UE 115-*a* may transmit an uplink transmission 210-*a* to the satellite 145-*a* via feeder link. The satellite 145-*a* may relay the uplink transmission 210-*a* as a downlink transmission 210-*b* to base station 105-*a* via the service link. In some examples, a cell may be provided or established by the satellite 145-*a* as part of the non-terrestrial network. While the following techniques are described as communications between the satellite 145-*a* and the UE 115-*a*, it should be noted that the satellite 145-*a* may alternatively act as a relay node and any communication described as originating from the satellite 145-*a* may alternatively originate from the base station 105-*a* and transmitted to the UE 115-*a* via the satellite 145-*a*.

The base station 105-*a* and the satellite 145-*a* may be a large distance (e.g., thousands of kilometers) apart and it may take a long time for electromagnetic waves to propagate over the distance between the base station 105-*a* and the satellite 145-*a* and between the satellite 145-*a* and the UE 115-*a*. The propagation delay and/or frequency shift (e.g., Doppler shift) for non-terrestrial networks may be many orders of magnitude larger than the propagation delay and/or frequency shift (e.g., Doppler shift) for terrestrial networks. Additionally or alternatively, high speeds of non-geostationary satellites, such as the satellite 145-*a* may promote propagation delay and/or Doppler shift. As a result, the UE 115-*a* may experience variation in uplink timing synchronization with the satellite 145-*a*.

By way of example, the satellite 145-*a* may traverse in an orbit, such as low earth orbit, medium earth orbit, or non-geostationary earth orbit. In any of these examples, the satellite 145-*a* may be located a large distance away from earth, and therefore there may be thousands of kilometers of distance between the base station 105-*a* and the UE 115-*a*. When the satellite 145-*a* is located in a low-earth orbit, the satellite 145-*a* may be between 600 km to 2000 km from earth and may travel at a rate of 7.5 km/s. In the example of a low earth orbit location of the satellite 145-*a*, a 1200 km orbit from earth with an elevation angle of 30°, the round trip delay variation rate may be on the order of 35 microseconds (μs) per second (s) (μs/s). Each transmission 205 or 210 between the base station 105-*a* and the UE 115-*a* may therefore travel the distance from the earth to the satellite 145-*a* and back to the earth. Thus, a distance traveled by a transmission may increase the propagation delay of the transmission. The velocity of the satellite 145-*a* may also increase the Doppler shift of a transmission. In some examples, the propagation delay may refer to a duration it takes for a signal to travel from a source to an intended recipient, while the Doppler shift may refer to a change in frequency between transmission and reception of a message.

To assist the UE in compensating for propagation delay and/or Doppler shift, the satellite 145-*a* or ground-based base station 105-*a* may broadcast location information for the satellite 145-*a* to the UE 115-*a*, for example, via downlink transmission 205-*b*. In some instances, the downlink transmission 205-*b* may be an example of a broadcast transmission or a unicast transmission. The satellite 145-*a* may periodically transmit location information (e.g., ephemeris, PVT information) to the UE 115-*a* in the non-terrestrial network-based coverage area 110-*a* via broadcast channels. The accuracy of location information at the UE 115-*a* may be based on how often the satellite 145-*a* communicates its location information to the UE 115-*a*. Such information may be carried via SIB and satellite location accuracy may be based on how frequently SIB is transmitted by the satellite 145-*a* via broadcast. According to one or more aspects described herein, the satellite 145-*a*, the UE 115-*a* and/or the base station 105-*a* may support unicast transmission and/or reception of satellite location information.

The satellite 145-*a* may transmit satellite location information via downlink transmission 205-*b* in dedicated (e.g., UE-specific) unicast signaling. In some examples, the unicast transmission of satellite location information via downlink transmission 205-*b* may be in addition to broadcast signaling of satellite location information similarly transmitted in a downlink transmission 205-*b*. In some examples, a broadcast transmission may be used when the UE 115-*a* is initializing communications with the satellite 145-*a* (e.g., acquiring a cell) while in an idle mode of communication. However, while, in a connected mode of communication, the UE 115-*a* may rely on dedicated unicast transmission of satellite location information from the satellite 145-*a*. As such, the UE 115-*a* may reduce the number of times the UE 115-*a* wakes-up to receive satellite location information. In some examples, the UE 115-*a* may be an example of an IoT-type or eMTC-type UEs, and may infrequently transmit uplink communications 210-*a*. In such cases, the SIB updates may be adjusted to be transmitted more infrequently, while the UE 115-*a* may additionally be provided with unicast satellite location information (e.g., via downlink transmission 205-*b*) at some times—e.g., before uplink transmission. Providing the unicast satellite location information prior to uplink transmission may reduce time spent at the UE to determine the location information and may thereby conserve power and increase reliability.

In some examples, a broadcast SIB (including satellite location information) may collide with a scheduled uplink transmission at the UE 115-*a*. For example, the UE 115-*a* may be an example of a half-duplex UE and the satellite 145-*a* may be unaware of times when the UE 115-*a* obtains satellite location information in order to maintain an uplink timing accuracy and uplink frequency accuracy.

Additionally or alternatively, the base station 105-*a* and/or the satellite 145-*a* may schedule an uplink transmission at the same time the UE 115-*a* obtains a SIB including satellite location information and thus a collision may occur. In some examples, for "coverage extended" settings having long transmission and/or long reads at the UE 115-*a*, the base station 105-*a* may not be aware of when the UE obtains the SIB including the satellite location information for maintaining a timing accuracy. In some cases, a SIB may be transmitted frequently. In such cases, the UE 115-*a* may monitor a subset of broadcast SIBs to maintain the accuracy, and the subset may be determined by the UE 115-*a* autonomously. Unicast transmission of satellite location information may mitigate drawbacks of broadcasting satellite location information.

In some examples, the UE 115-*a* may receive broadcast satellite location information via the downlink transmission 205-*b*. For example, the UE 115-*a* may receive, from base station 105-*a* or satellite 145-*a*, a broadcast communication including a first location of satellite 145-*a*. In some examples, the broadcast communication is transmitted periodically. The base station 105-*a* or the satellite 145-*a* may provide the satellite location information (e.g., a provided location, location determined based on a GNSS, location determined based on a GPS, or virtual geo-location) via a SIB in the broadcast communication. Based on receiving the satellite location information, the UE 115-*a* may read or decode the SIB and may acquire the broadcast satellite location information.

The base station 105-*a* or the satellite 145-*a* may transmit a unicast satellite location information via downlink transmission 205-*b* (or for example, via uplink transmission 205-*a* and downlink transmission 205-*b*). For example, the satellite 145-*a* may transmit a unicast satellite location information to the UE 115-*a* via a dedicated or UE-specific unicast message in downlink transmission 205-*b*. The unicast transmission, including satellite location information at a second time, may, in some examples, be transmitted in addition to the broadcast satellite location information and may include updated satellite location information, e.g., satellite location information related to the satellite 145-a that was acquired or measured more recently than the broadcast satellite location information. For example, the UE 115-a may receive the second location information at part of or during a connection setup procedure (e.g., an RRC connection procedure) with the base station 105-a or the satellite 145-a. For example, the UE 115-a may receive the unicast satellite location information in an RRC connect message. In some other examples, the UE 115-a may receive the unicast satellite location information via a physical (PHY) layer channel via physical downlink shared channel (PDSCH), for example, as scheduled by downlink control information (DCI) in downlink transmission 205-b.

In some other examples, the satellite 145-a or the base station 105-a may transmit DCI scheduling an uplink transmission as well as a downlink grant (e.g., PDSCH). For example, the DCI may schedule a PDSCH carrying a higher layer message that includes satellite location information before scheduling an uplink transmission. The DCI may indicate to decode the PDSCH that includes information for the uplink grant and the second satellite location information. In some examples, the DCI may provide information for the uplink grant and the second satellite location information directly without a PDSCH. For example, the uplink grant or the second satellite location, or both, may be embedded in the DCI message. In some examples, the DCI scheduling an uplink transmission may schedule a concomitant downlink grant closely preceding the uplink grant. The UE 115-a may determine the satellite location information "on demand" prior to the uplink transmission. Thus, in such examples, before transmitting an uplink message, the UE 115-a may receive updated satellite location information to use in determining an uplink timing or uplink frequency to account for propagation delay or Doppler shift.

In some other examples, the UE 115-a may transmit occasionally or sparsely and the satellite 145-a or the base station 105-a may provide a configured grant (e.g., periodic configured grant) or semi-persistent scheduling (SPS) downlink grant including the unicast satellite location information, In some examples, the satellite 145-a or the base station 105-a may determine to provide the configured grant or SPS downlink grant based on a transmission schedule of the UE 115-a. For example, the UE 115-a may transmit according to a schedule and the satellite 145-a or the base station 105-a may provide the unicast satellite location information to preempt transmission occasions at the UE 115-a.

In some other examples, the UE 115-a may be an example of an NB-IoT UE or an eMTC UE and may be provided a preconfigured uplink resource (PUR) configuration by the serving cell (e.g., the base station 105-a or the satellite 145-a). The UE 115-a may transition from a connected mode to an idle mode, which may trigger a PUR configuration message transmission. For example, the UE 115-a may receive an RRC connection release message via downlink transmission 205-b including the PUR configuration. In some examples, the PUR configuration may include the unicast location information and may additionally include resources that the UE 115-a may use to transmit in the idle mode without reestablishing a connected mode. In some other examples, the UE 115-a may be provided with a PUR configuration including a resource allocation for transmitting in idle mode. The UE 115-a may transmit a message via uplink communications 210-a according to the PUR configuration and may receive a response including the unicast satellite location information via downlink transmission 205-b. In some examples, the PUR response message may include a timing or frequency correction in addition to or as an alternative to the second location information. The timing or frequency correction may be calculated or determined based on the PUR message transmitted by the UE 115-a.

It may be noted that any of the methods or techniques for transmitting satellite location information via unicast communications may be implemented in conjunction with others. For instance, the satellite 145-a may transmit (via downlink transmission 205-b) location information via DCI at a first time, and then may transmit updated location information via a configured grant at a second time, among other examples.

The UE 115-a may determine an uplink timing or an uplink frequency, or both, for uplink communications to compensate for propagation delay or Doppler shift that may occur when communicating with the satellite 145-a. For example, the UE 115-a may determine a pre-compensation (e.g., uplink timing or uplink frequency, or both) and may apply the pre-compensation before initiating uplink communications to or via the satellite 145-a. In some examples, the UE 115-a may determine the pre-compensation based on the broadcast location information or the unicast location information. In some examples, the UE 115-a may be in a connected mode (e.g., RRC CONNECTED mode) and may determine the pre-compensation based on the second satellite location information. In some examples, the UE may be in an idle mode (e.g., RRC IDLE mode) and may determine the pre-compensation based on the first satellite location information.

Additionally or alternatively, the UE 115-a may determine whether to use the first satellite location information or the second satellite location information based on one or more of an accuracy of the first satellite location information, an accuracy of the second satellite location information, a timing of the first satellite location information, a timing of the second satellite location information, or a combination thereof. For example, the UE 115-a may acquire satellite location information while performing a connection procedure. At some later time, the UE 115-a may be in idle mode and may determine to transmit an uplink message but may determine that the unicast message (e.g., a configured grant) including satellite location information will not be received in time to transmit the message and may determine to use the first satellite location information (e.g., received via broadcast SIB) for uplink communications. For example, the broadcast location information may be transmitted periodically and the UE 115-a may determine to wake up to receive satellite location information via SIB rather than waiting to receive satellite location information via a periodic configured grant.

The UE 115-a may initiate uplink communications with the satellite 145-a or through the satellite 145-a to the base station 105-a based on the determined uplink timing, the determined uplink frequency, or both. For example, the UE 115-a may adjust a timing or transmit frequency of the uplink message to account for propagation delay or Doppler shift based on the first location information or the second location information, and may thus efficiently communicate with the satellite 145-a.

Additionally or alternatively, the UE 115-a may transmit capability signaling to the satellite 145-a or the base station 105-a which may be examples of devices in a non-terrestrial network and may act as a serving satellite or a serving base station (e.g., a serving ground base station), respectively. For example, the UE 115-a may be a fixed UE (e.g., a stationary UE, an immobile UE, or the like) or may be a mobile UE and the capability signaling may include an indication of such. For example, the UE 115-a may indicate to the satellite 145-a that it is a mobile UE or a stationary UE. In some examples, if the UE 115-a is a mobile UE, the capability signaling may additionally or alternatively include an indication of how often the UE 115-a ascertains its own location. For example, the UE 115-a may receive, from a device (e.g., which may be an example of a satellite 145 as described with reference to FIG. 1 but may be different from satellite 145-a) in a GNSS or GPS, location information at some periodicity according to a capability of the UE 115-a. In some examples, the device may be used for control information including location information rather than data communications. The UE 115-a may be capable of receiving a GNSS or GPS fix to ascertain its own location hourly, daily, weekly, among other examples. The UE 115-a may include an indication of such a periodicity in the capability signaling to the satellite 145-a. In some examples, if the UE 115-a is a mobile UE, the capability signaling may additionally or alternatively include a timing indication (e.g., a schedule) at which the UE may receive a GNSS or GPS fix (e.g., satellite assisted location information). As an illustrative example, the UE 115-a may include a timing indication that indicates the UE 115-a receives a GNSS or GPS fix daily at midnight. Other examples of timing indications may specify different times at which the UE 115-a is capable of receiving GNSS or GPS location information according to a periodicity supported by the capabilities of the UE 115-a. In such examples, the UE 115-a may be an IoT UE or an eMTC UE.

In some examples, the UE 115-a may receive the satellite location information based on or in response to transmitting its capability information. Additionally or alternatively, the UE 115-a may determine an uplink timing or uplink frequency, or both based on the UE capability information.

Figure 3:
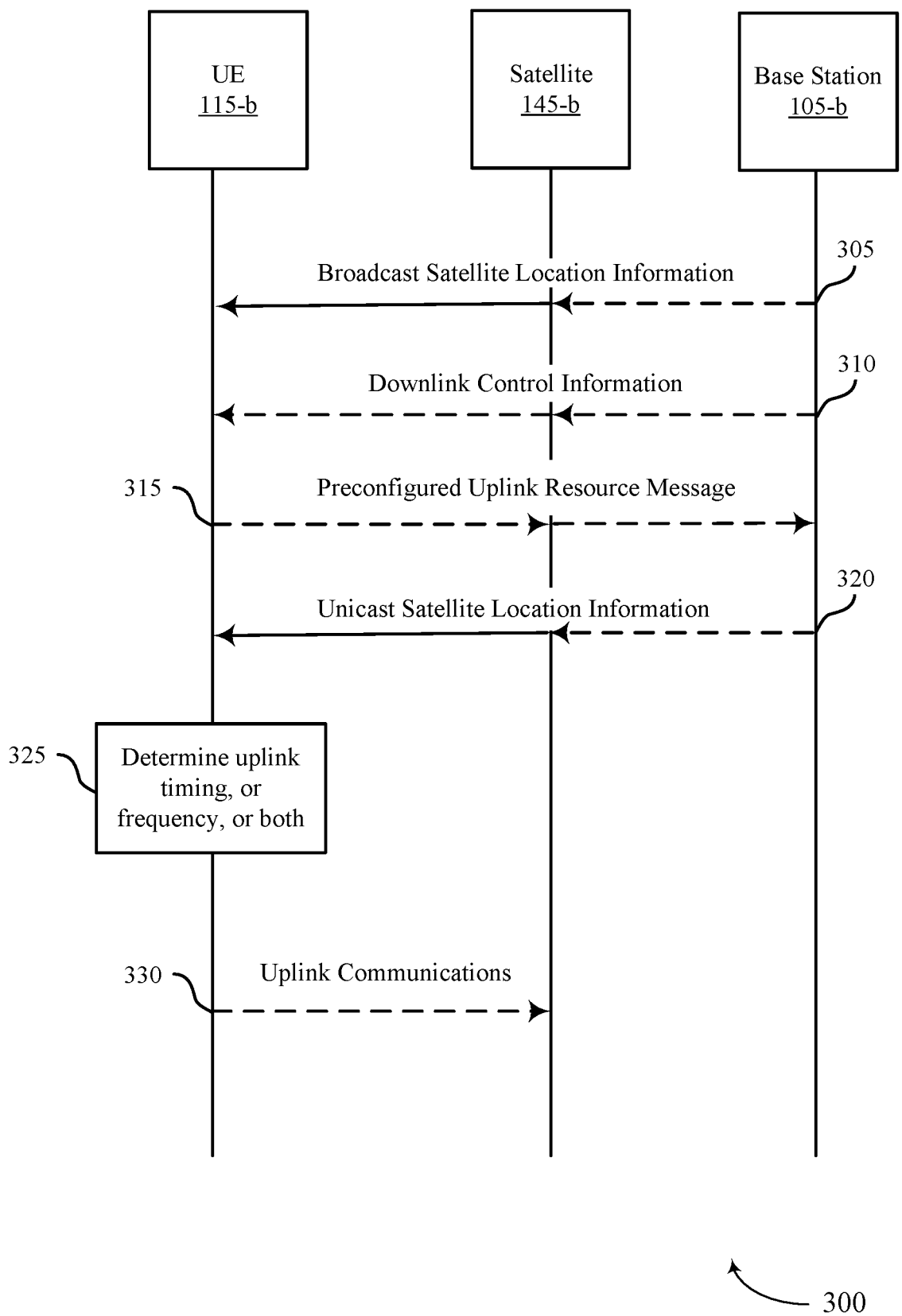
FIG. 3 illustrates an example of a process flow that supports dedicated unicast transmission of satellite location information in accordance with one or more aspects of the present disclosure.

FIG. 3 illustrates an example of a process flow 300 that supports dedicated unicast transmission of satellite location information in accordance with one or more aspects of the present disclosure. The process flow 300 may implement aspects of the wireless communications systems 100 and 200, as described with reference to FIGS. 1 and 2. For example, the process flow 300 may be based on a configuration by a network, and implemented by a UE for receiving satellite location information for use in determining uplink timing or uplink transmit frequency in a non-terrestrial network, as described with reference to FIGS. 1 and 2.

The process flow 300 may include a base station 105-b, a UE 115-b, and a satellite 145-b, which may be examples of a base station 105, a UE 115, and a satellite 145 as described with reference to FIGS. 1 and 2. In the following description of the process flow 300, the operations between the base station 105-b, the UE 115-b, and the satellite 145-b may be performed in a different order than the example order shown, or the operations performed by the base station 105-b, the UE 115-b, and the satellite 145-b may be performed in different orders or at different times. Some operations may also be omitted from the process flow 300, and other operations may be added to the process flow 300. In the example of FIG. 3, the base station 105-b, the UE 115-b, and the satellite 145-b may be in communication with each other via a non-terrestrial network. The process flow 300 may support higher data rates, improved mobility support for the UE 115-b in the non-terrestrial network, and reduced power consumption.

At 305, the UE 115-b may receive first satellite location information via a broadcast channel or communication. For example, the UE 115-b may receive, from base station 105-b or satellite 145-b, a broadcast communication including a first location of satellite 145. In some examples, the broadcast communication may be transmitted periodically. In some examples, the base station 105-b or the satellite 145-b provide the satellite location information (e.g., a provided location, location determined based on a GNSS, location determined based on a GPS, or virtual geo-location) via a SIB in the broadcast communication. Based on receiving the satellite location information, the UE 115-b may read or decode the SIB and may acquire the first satellite location information.

At, 320, the base station 105-b or the satellite 145-b may transmit a second satellite location information via a unicast channel or unicast communication. For example, the satellite 145-b (or base station 105-b) may transmit a second location information to the UE 115-b via a dedicated or UE-specific unicast message. The unicast transmission, including second satellite location information, may, in some examples, be transmitted in addition to the broadcast satellite location information and may include updated satellite location information, e.g., satellite location information related to the satellite 145-b that was acquired or measured more recently than the broadcast satellite location information.

For example, the UE 115-b may receive the second location information as part of or during a connection procedure (e.g., an RRC connection procedure). For example, the UE 115-b may receive the second satellite location information in an RRC connect message. In some other examples, the UE 115-b may receive the second location information via a physical layer channel (e.g., PHY layer channel) via PDSCH, for example, as scheduled by DCI at 310.

In some other examples, at 310, the satellite 145-b or the base station 105-b may transmit DCI scheduling an uplink transmission as well as a downlink grant (e.g., PDSCH). For example, the DCI may schedule a PDSCH carrying a higher layer message that includes satellite location information before scheduling an uplink transmission. For example, the DCI may indicate to decode the PDSCH that includes information for the uplink grant and the second satellite location information. In some examples, the DCI may provide information for the uplink grant and the second satellite location information directly without a PDSCH. For example, the uplink grant or the second satellite location, or both may be embedded in the DCI. Thus, in such examples, before transmitting the uplink message, the UE 115-b may receive updated satellite location information.

In some other examples, the UE 115-b may transmit occasionally or sparsely and the satellite 145-b or the base station 105-b may provide a configured grant or SPS including the second satellite location information, according to a transmission schedule of the UE 115-b.

In some other examples, the UE 115-b may be an example of an NB-IoT UE or an eMTC UE and may be provided a PUR configuration. The UE 115-b may transition from a connected mode to an idle mode and may receive a PUR configuration message. For example, the UE 115-b may receive an RRC connection release message including the PUR configuration. In some examples, the PUR configuration may include the second location information and may additionally include resources that the UE 115-b may use to transmit in the idle mode without reestablishing the connected mode. In some other examples, the UE 115-b may receive a PUR configuration that includes a resource allocation for transmitting in idle mode.

At 315, the UE 115-b may transmit according to the PUR configuration and, at 320, the UE 115-b may receive a response including the second satellite location information. In some examples, the PUR response message may include a timing or frequency correction in addition to or as an alternative to the second location information. The timing or frequency correction may be calculated or determined based on the PUR message transmitted at 320.

It may be noted that any of the methods or techniques for transmitting satellite location information via unicast communications may be implemented in conjunction with others. For example, the satellite 145-*b* or the base station 105-*b* may transmit location information via DCI at a first time then may transmit updated location information via a configured grant at a second time.

At 325, the UE may determine an uplink timing or an uplink frequency, or both, for uplink communications to compensate for propagation delay or Doppler shift that may occur when communicating with the satellite 145-*b*. For example, the UE may determine a pre-compensation (e.g., uplink timing or uplink frequency, or both) and may apply the pre-compensation before initiating uplink communications to or via the satellite 145-*b*. Additionally or alternatively, the UE may determine whether to use the first satellite location information or the second satellite location information based on one or more of an accuracy of the first satellite location information, an accuracy of the second satellite location information, a timing of the first satellite location information, a timing of the second satellite location information, or a combination thereof.

At 330, the UE may initiate uplink communications with the satellite 145-*b* or through the satellite 145-*b* to the base station 105-*b* based on the determined uplink timing, the determined uplink frequency, or both. For example, the UE may adjust a timing or transmit frequency of the uplink message to account for propagation delay or Doppler shift based on the first location information or the second location information.

Figure 4:
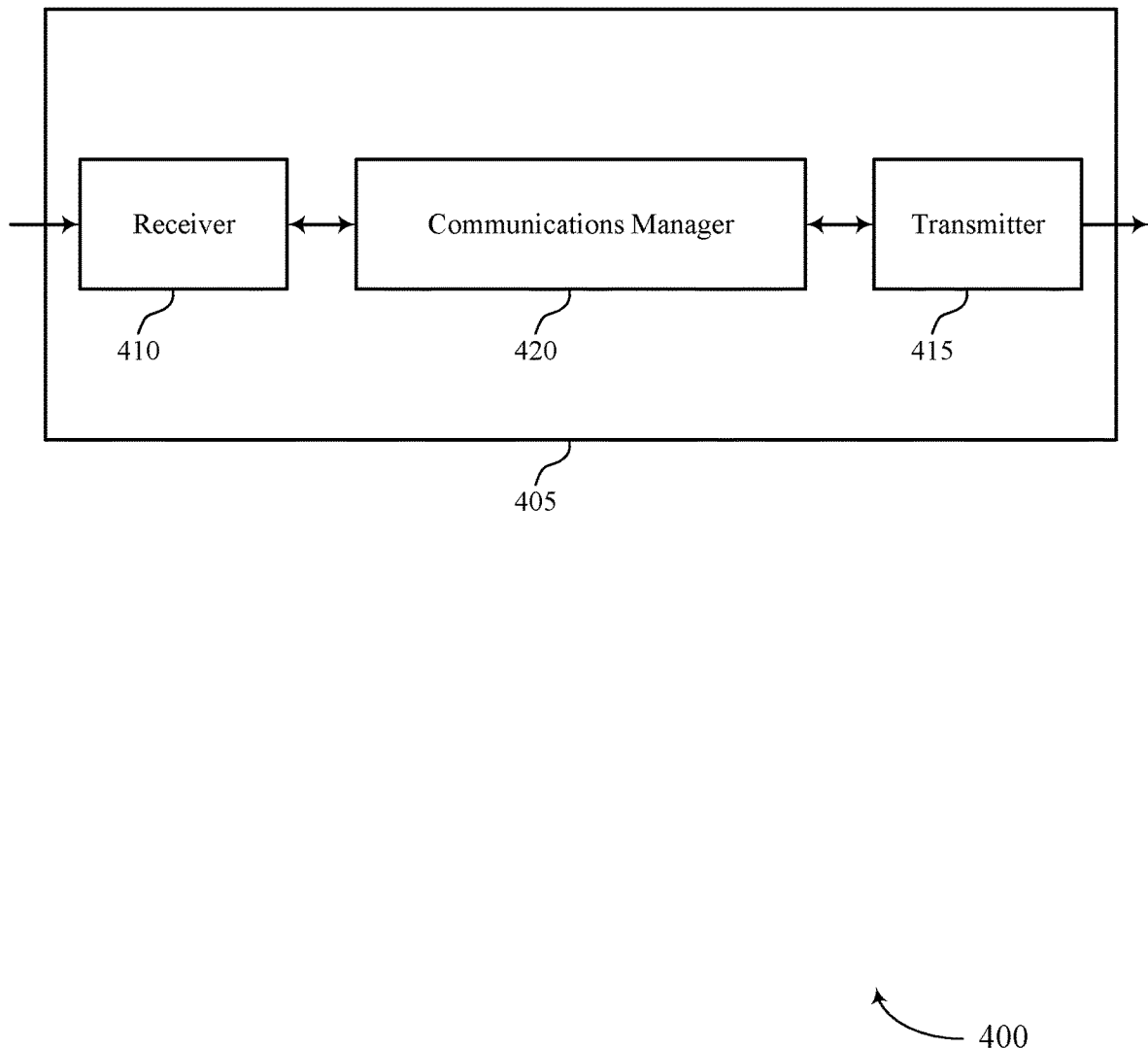
FIGS. 4 and 5 show block diagrams of devices that support dedicated unicast transmission of satellite location information in accordance with one or more aspects of the present disclosure.

FIG. 4 shows a block diagram 400 of a device 405 that supports dedicated unicast transmission of satellite location information in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to dedicated unicast transmission of satellite location information). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to dedicated unicast transmission of satellite location information). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of dedicated unicast transmission of satellite location information as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving first satellite location information from a wireless network node via a broadcast message. The communications manager 420 may be configured as or otherwise support a means for receiving second satellite location information from the wireless network node via a unicast message, where both the first satellite location information and the second satellite location information pertain to a same satellite. The communications manager 420 may be configured as or otherwise support a means for transmitting via the satellite based on at least one of the first satellite location information or the second satellite location information.

Additionally or alternatively, the communications manager 420 may support wireless communication at a UE in accordance with examples as disclosed herein. For example, the communications manager 420 may be configured as or otherwise support a means for transmitting, to a wireless network node, a capability indication including at least one of UE mobility information, a periodicity for the UE to participate in a satellite-assisted UE location determination, a timing associated with the satellite-assisted UE location determination, or any combination thereof. The communications manager 420 may be configured as or otherwise support a means for communicating with the wireless network node based on the capability indication.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for communications with high-altitude vehicles (e.g., satellites or other non-terrestrial-based equipment), user terminals, and base stations, in non-terrestrial networks, among other applications. Implementations may support increased reliability and, in some examples, may promote lower power consumption for user terminals in non-terrestrial networks compared to terrestrial networks.

Figure 5:
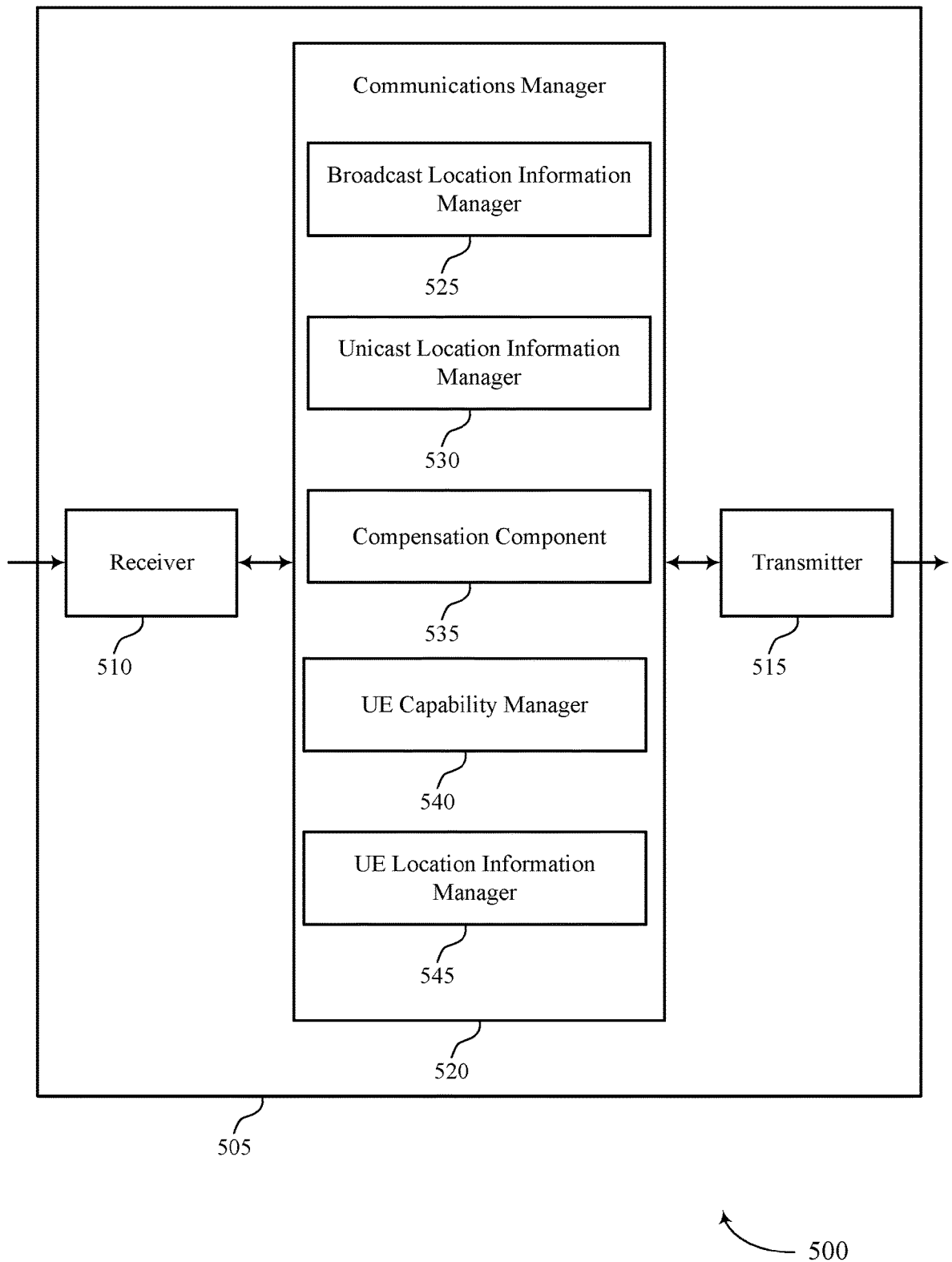

FIG. 5 shows a block diagram 500 of a device 505 that supports dedicated unicast transmission of satellite location information in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to dedicated unicast transmission of satellite location information). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to dedicated unicast transmission of satellite location information). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of dedicated unicast transmission of satellite location information as described herein. For example, the communications manager 520 may include a broadcast location information manager 525, a unicast location information manager 530, a compensation component 535, a UE capability manager 540, a UE location information manager 545, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The broadcast location information manager 525 may be configured as or otherwise support a means for receiving first satellite location information from a wireless network node via a broadcast message. The unicast location information manager 530 may be configured as or otherwise support a means for receiving second satellite location information from the wireless network node via a unicast message, where both the first satellite location information and the second satellite location information pertain to a same satellite. The compensation component 535 may be configured as or otherwise support a means for transmitting an uplink communication via the satellite based on at least one of the first satellite location information or the second satellite location information.

Additionally or alternatively, the communications manager 520 may support wireless communication at a UE in accordance with examples as disclosed herein. The UE capability manager 540 may be configured as or otherwise support a means for transmitting, to a wireless network node, a capability indication including at least one of UE mobility information, a periodicity for the UE to participate in a satellite-assisted UE location determination, a timing associated with the satellite-assisted UE location determination, or any combination thereof. The UE location information manager 545 may be configured as or otherwise support a means for communicating with the wireless network node based on the capability indication.

Figure 6:
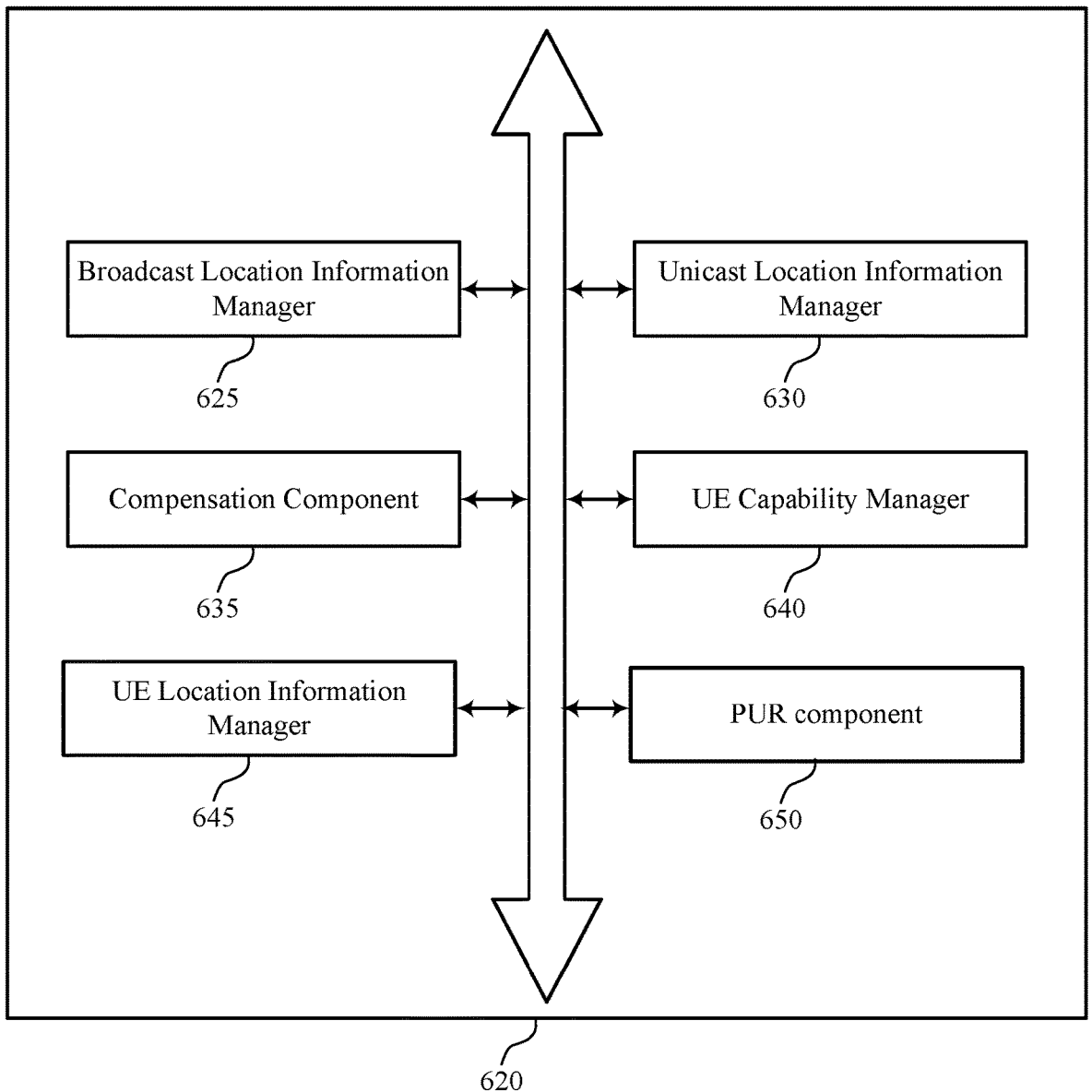
FIG. 6 shows a block diagram of a communications manager that supports dedicated unicast transmission of satellite location information in accordance with one or more aspects of the present disclosure.

FIG. 6 shows a block diagram 600 of a communications manager 620 that supports dedicated unicast transmission of satellite location information in accordance with one or more aspects of the present disclosure. The communications manager 620 may be an example of aspects of a communications manager 420, a communications manager 520, or both, as described herein. The communications manager 620, or various components thereof, may be an example of means for performing various aspects of dedicated unicast transmission of satellite location information as described herein. For example, the communications manager 620 may include a broadcast location information manager 625, a unicast location information manager 630, a compensation component 635, a UE capability manager 640, a UE location information manager 645, a PUR component 650, or any combination thereof. Each of these components may communicate, directly or indirectly, with one another (e.g., via one or more buses).

The communications manager 620 may support wireless communication at a UE in accordance with examples as disclosed herein. The broadcast location information manager 625 may be configured as or otherwise support a means for receiving first satellite location information from a wireless network node via a broadcast message. The unicast location information manager 630 may be configured as or otherwise support a means for receiving second satellite location information from the wireless network node via a unicast message, where both the first satellite location information and the second satellite location information pertain to a same satellite. The compensation component 635 may be configured as or otherwise support a means for transmitting an uplink communication via the satellite based on at least one of the first satellite location information or the second satellite location information.

In some examples, the unicast location information manager 630 may be configured as or otherwise support a means for receiving the second satellite location information during a connection setup procedure with the wireless network node. In some examples, the unicast location information manager 630 may be configured as or otherwise support a means for receiving, from the wireless network node, DCI scheduling a PDSCH that includes the second satellite location information.

In some examples, the unicast location information manager 630 may be configured as or otherwise support a means for receiving, from the wireless network node, DCI scheduling an uplink grant for transmitting the uplink communication and a downlink grant, the downlink grant preceding the uplink grant and including the second satellite location information.

In some examples, the unicast location information manager 630 may be configured as or otherwise support a means for receiving, from the wireless network node, DCI including the second satellite location information. In some examples, the unicast location information manager 630 may be configured as or otherwise support a means for receiving the second satellite location information via a configured grant or an SPS downlink grant, or both.

In some examples, the PUR component 650 may be configured as or otherwise support a means for receiving the second satellite location information via a preconfigured uplink resource configuration message. In some examples, the PUR component 650 may be configured as or otherwise support a means for transmitting a preconfigured uplink resource message, the receiving the second satellite location information including receiving the second satellite location information in response to transmitting the preconfigured uplink resource message.

In some examples, the compensation component 635 may be configured as or otherwise support a means for determining, based on at least one of the first satellite location information or the second satellite location information, an uplink timing, an uplink frequency, or both, for transmitting the uplink communication via the satellite. In some examples, the compensation component 635 may be configured as or otherwise support a means for determining that the UE is in an idle mode, where the uplink timing, the uplink frequency, or both are determined based on the first satellite location information.

In some examples, the compensation component 635 may be configured as or otherwise support a means for determining that the UE is in a connected mode, where the uplink timing, the uplink frequency, or both are determined based on the second satellite location information.

In some examples, the compensation component 635 may be configured as or otherwise support a means for determining whether to use the first satellite location information or the second satellite location information to determine the uplink timing, the uplink frequency, or both based on one or more of an accuracy of the first satellite location information, an accuracy of the second satellite location information, a timing of the first satellite location information, a timing of the second satellite location information, or a combination thereof.

In some examples, the UE includes a narrowband IoT UE or an enhanced machine-type communication UE. In some examples, the wireless network node includes a base station or the satellite.

In some examples, the UE capability manager 640 may be configured as or otherwise support a means for transmitting, to a wireless network node, a capability indication including at least one of UE mobility information, a periodicity for the UE to participate in a satellite-assisted UE location determination, a timing associated with the satellite-assisted UE location determination, or any combination thereof.

In some examples, the UE mobility information indicates that the UE is a fixed UE or a mobile UE. In some examples, the UE includes an IoT UE or an enhanced machine-type communication UE.

Additionally or alternatively, the communications manager 620 may support wireless communication at a UE in accordance with examples as disclosed herein. The UE capability manager 640 may be configured as or otherwise support a means for transmitting, to a wireless network node, a capability indication including at least one of UE mobility information, a periodicity for the UE to participate in a satellite-assisted UE location determination, a timing associated with the satellite-assisted UE location determination, or any combination thereof. The UE location information manager 645 may be configured as or otherwise support a means for communicating with the wireless network node based on the capability indication.

In some examples, the capability indication is transmitted as part of a UE capability message. In some examples, the UE mobility information indicates that the UE is a fixed UE or a mobile UE. In some examples, the UE includes an IoT UE or an enhanced machine-type communication UE. In some examples, the satellite-assisted UE location determination is based on a GNSS or a GPS and the wireless network node includes a serving satellite or a serving base station in a non-terrestrial network.

Figure 7:
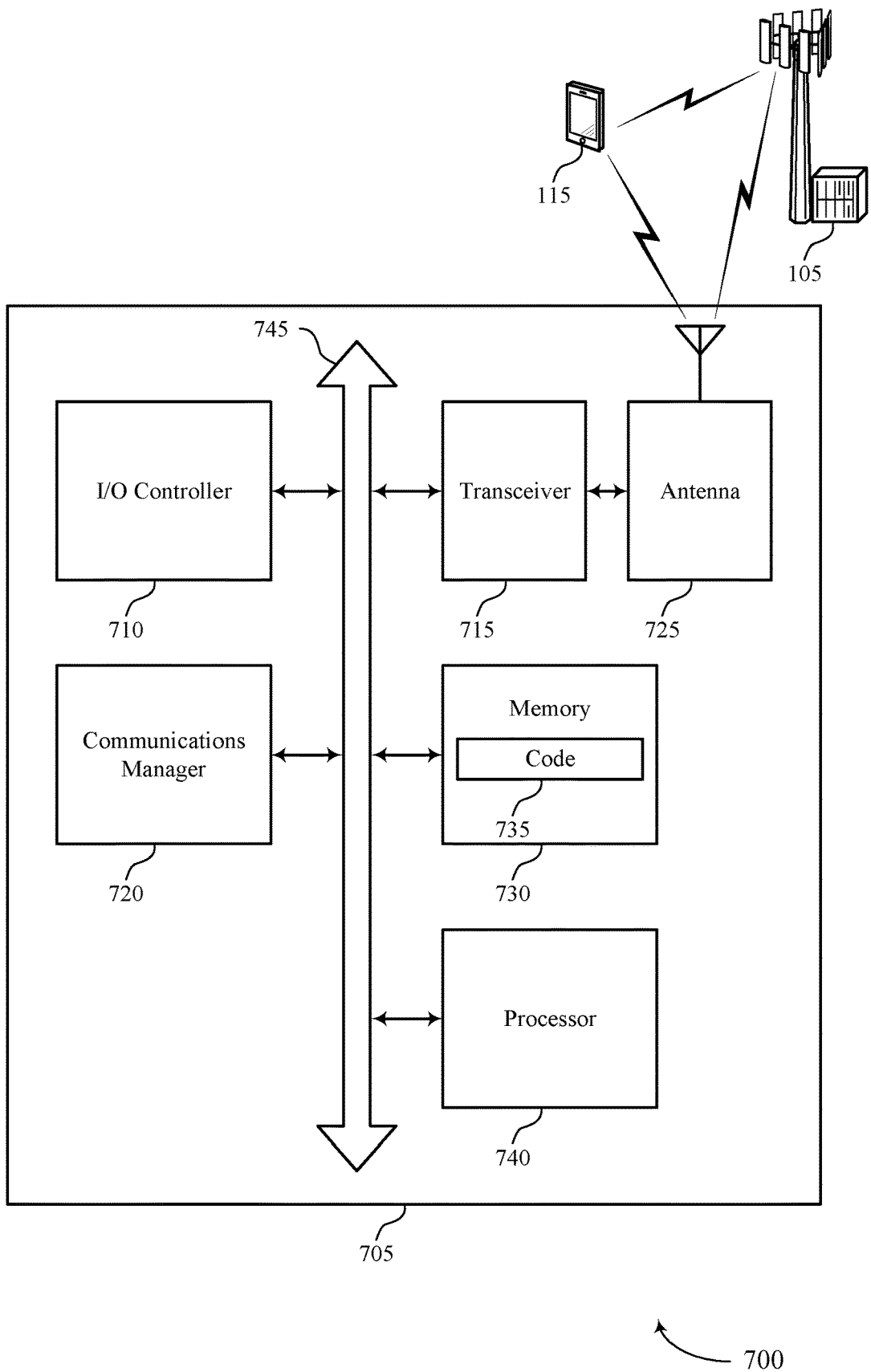
FIG. 7 shows a diagram of a system including a device that supports dedicated unicast transmission of satellite location information in accordance with one or more aspects of the present disclosure.

FIG. 7 shows a diagram of a system 700 including a device 705 that supports dedicated unicast transmission of satellite location information in accordance with one or more aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting dedicated unicast transmission of satellite location information). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving first satellite location information from a wireless network node via a broadcast message. The communications manager 720 may be configured as or otherwise support a means for receiving second satellite location information from the wireless network node via a unicast message, where both the first satellite location information and the second satellite location information pertain to a same satellite. The communications manager 720 may be configured as or otherwise support a means for transmitting an uplink communication via the satellite based on at least one of the first satellite location information or the second satellite location information.

Additionally or alternatively, the communications manager 720 may support wireless communication at a UE in accordance with examples as disclosed herein. For example, the communications manager 720 may be configured as or otherwise support a means for transmitting, to a wireless network node, a capability indication including at least one of UE mobility information, a periodicity for the UE to participate in a satellite-assisted UE location determination, a timing associated with the satellite-assisted UE location determination, or any combination thereof. The communications manager 720 may be configured as or otherwise support a means for communicating with the wireless network node based on the capability indication.

By including or configuring the communications manager 720 in accordance with examples as described herein, the device 705 may support techniques for communications with high-altitude vehicles (e.g., satellites or other non-terrestrial-based equipment), user terminals, and base stations, in non-terrestrial networks, among other applications. Further, implementations may support reduced power consumption, improved communication reliability, longer battery life, improved utilization of processing capability, among other examples.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of dedicated unicast transmission of satellite location information as described herein, or the processor 740 and the memory 730 may be otherwise configured to perform or support such operations.

Figure 8:
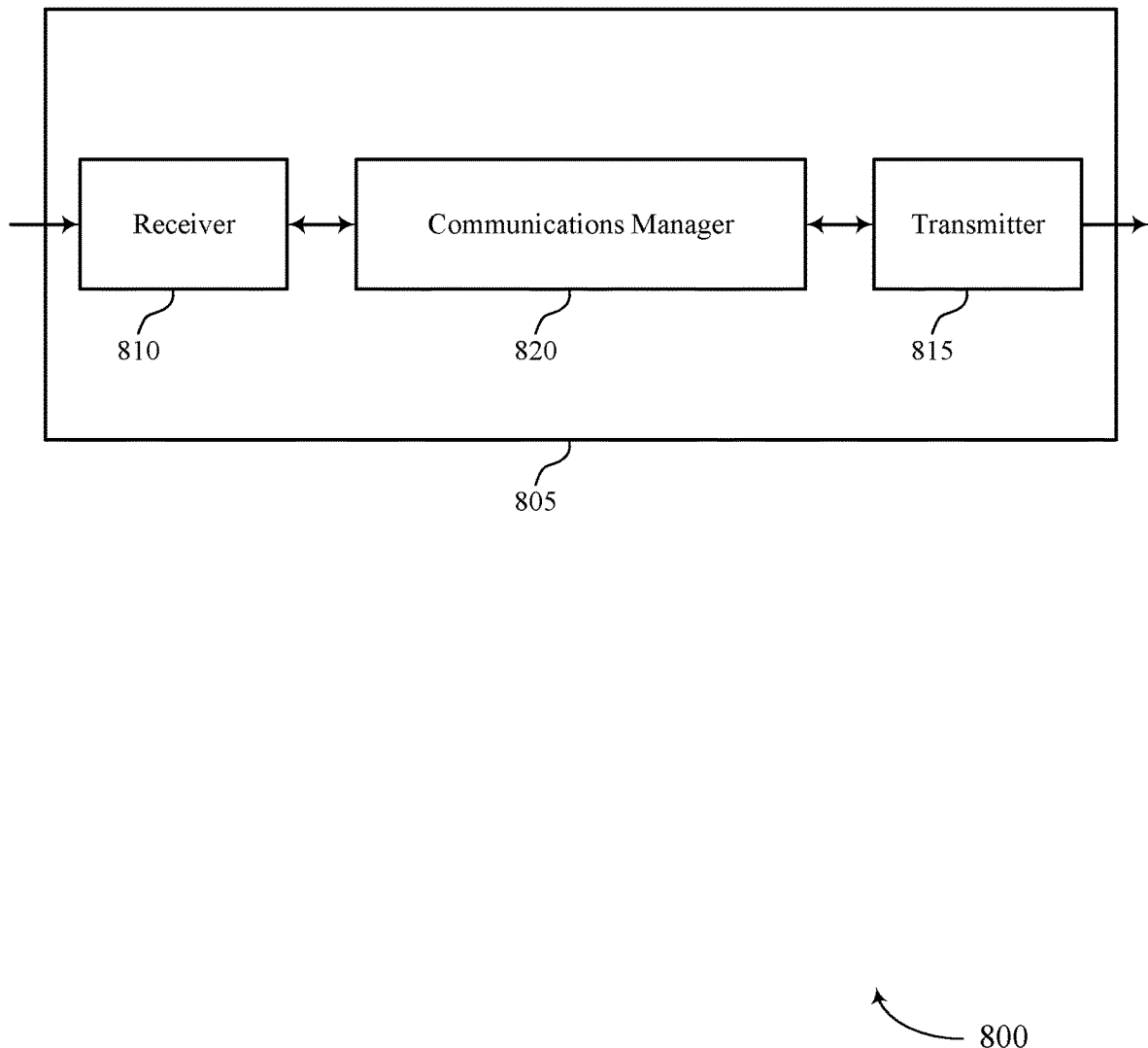
FIGS. 8 and 9 show block diagrams of devices that support dedicated unicast transmission of satellite location information in accordance with one or more aspects of the present disclosure.

FIG. 8 shows a block diagram 800 of a device 805 that supports dedicated unicast transmission of satellite location information in accordance with one or more aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to dedicated unicast transmission of satellite location information). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to dedicated unicast transmission of satellite location information). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of dedicated unicast transmission of satellite location information as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a wireless network node in accordance with examples as disclosed herein. For example, the communications manager 820 may be configured as or otherwise support a means for transmitting a first satellite location information to a UE via a broadcast message. The communications manager 820 may be configured as or otherwise support a means for transmitting a second satellite location information to the UE via a unicast message, where both the first satellite location information and the second satellite location information pertain to a same satellite. The communications manager 820 may be configured as or otherwise support a means for receiving an uplink communication based on at least one of the first satellite location information or the second satellite location information.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for communications with high-altitude vehicles (e.g., satellites or other non-terrestrial-based equipment), user terminals, and base stations, in non-terrestrial networks, among other applications. Further, implementations may support reduced power consumption and, in some examples, may promote higher reliability for user terminals in non-terrestrial networks compared to terrestrial networks.

Figure 9:
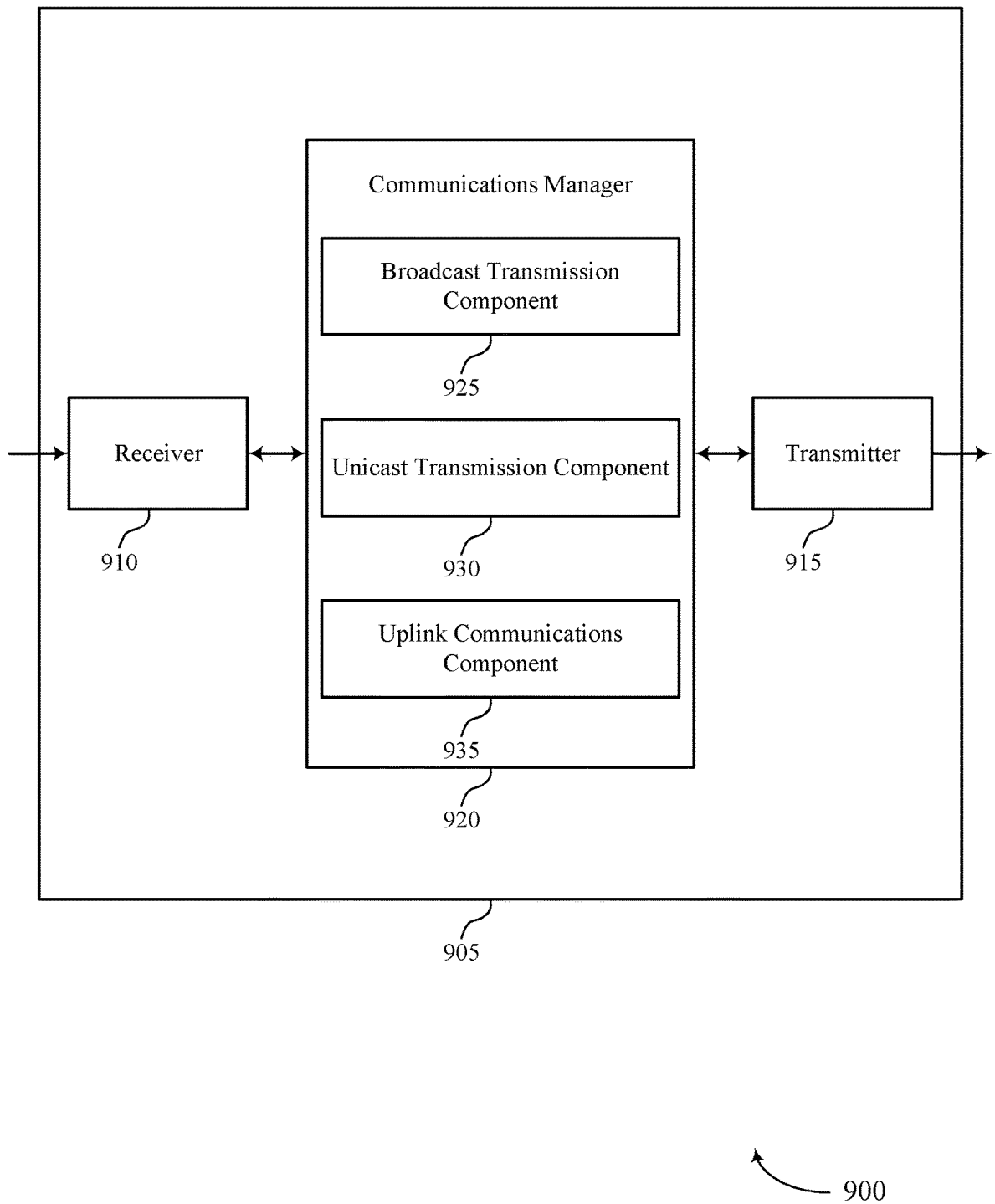

FIG. 9 shows a block diagram 900 of a device 905 that supports dedicated unicast transmission of satellite location information in accordance with one or more aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to dedicated unicast transmission of satellite location information). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to dedicated unicast transmission of satellite location information). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of dedicated unicast transmission of satellite location information as described herein. For example, the communications manager 920 may include a broadcast transmission component 925, a unicast transmission component 930, an uplink communications component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a wireless network node in accordance with examples as disclosed herein. The broadcast transmission component 925 may be configured as or otherwise support a means for transmitting a first satellite location information to a UE via a broadcast message. The unicast transmission component 930 may be configured as or otherwise support a means for transmitting a second satellite location information to the UE via a unicast message, where both the first satellite location information and the second satellite location information pertain to a same satellite. The uplink communications component 935 may be configured as or otherwise support a means for receiving an uplink communication based on at least one of the first satellite location information or the second satellite location information.

Figure 10:
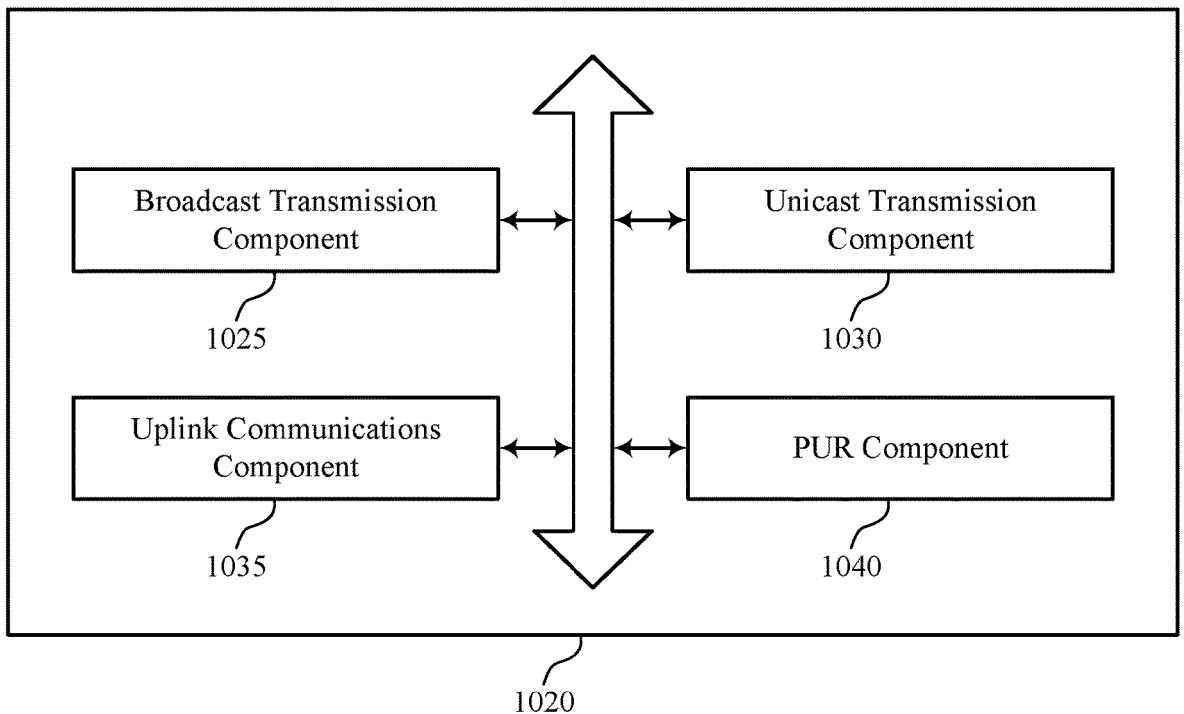
FIG. 10 shows a block diagram of a communications manager that supports dedicated unicast transmission of satellite location information in accordance with one or more aspects of the present disclosure.

FIG. 10 shows a block diagram 1000 of a communications manager 1020 that supports dedicated unicast transmission of satellite location information in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of dedicated unicast transmission of satellite location information as described herein. For example, the communications manager 1020 may include a broadcast transmission component 1025, a unicast transmission component 1030, an uplink communications component 1035, a PUR component 1040, or any combination thereof. Each of these components may communicate, directly or indirectly, with one another (e.g., via one or more buses).

The communications manager 1020 may support wireless communication at a wireless network node in accordance with examples as disclosed herein. The broadcast transmission component 1025 may be configured as or otherwise support a means for transmitting a first satellite location information to a UE via a broadcast message. The unicast transmission component 1030 may be configured as or otherwise support a means for transmitting a second satellite location information to the UE via a unicast message, where both the first satellite location information and the second satellite location information pertain to a same satellite. The uplink communications component 1035 may be configured as or otherwise support a means for receiving an uplink communication based on at least one of the first satellite location information or the second satellite location information.

In some examples, the unicast transmission component 1030 may be configured as or otherwise support a means for transmitting the second satellite location information during a connection setup procedure with the UE. In some examples, the unicast transmission component 1030 may be configured as or otherwise support a means for transmitting, to the UE, DCI scheduling a PDSCH that includes the second satellite location information.

In some examples, the unicast transmission component 1030 may be configured as or otherwise support a means for transmitting, to the UE, DCI scheduling an uplink grant for receiving the uplink communication and a downlink grant, the downlink grant preceding the uplink grant and including the second satellite location information. In some examples, the unicast transmission component 1030 may be configured as or otherwise support a means for transmitting, to the UE, DCI including the second satellite location information.

In some examples, the unicast transmission component 1030 may be configured as or otherwise support a means for transmitting the second satellite location information via a periodic configured grant, or SPS downlink grant, or both. In some examples, the unicast transmission component 1030 may be configured as or otherwise support a means for transmitting the second satellite location information via a preconfigured uplink resource configuration message.

In some examples, the PUR component 1040 may be configured as or otherwise support a means for transmitting the second satellite location information via a preconfigured uplink resource configuration message.

In some examples, the PUR component 1040 may be configured as or otherwise support a means for receiving a preconfigured uplink resource message, the transmitting the second satellite location information including transmitting the second satellite location information in response to receiving the preconfigured uplink resource message. In some examples, the broadcast message is transmitted periodically.

In some examples, receiving the uplink communication is further based on an uplink timing, an uplink frequency or both determined based on the first satellite location information or the second satellite location information. In some examples, the uplink communications component 1035 may be configured as or otherwise support a means for receiving the uplink communication via the satellite, where the wireless network node includes a base station.

In some examples, the wireless network node includes the satellite. In some examples, the UE includes a narrowband IoT UE or an enhanced machine-type communication UE.

Figure 11:
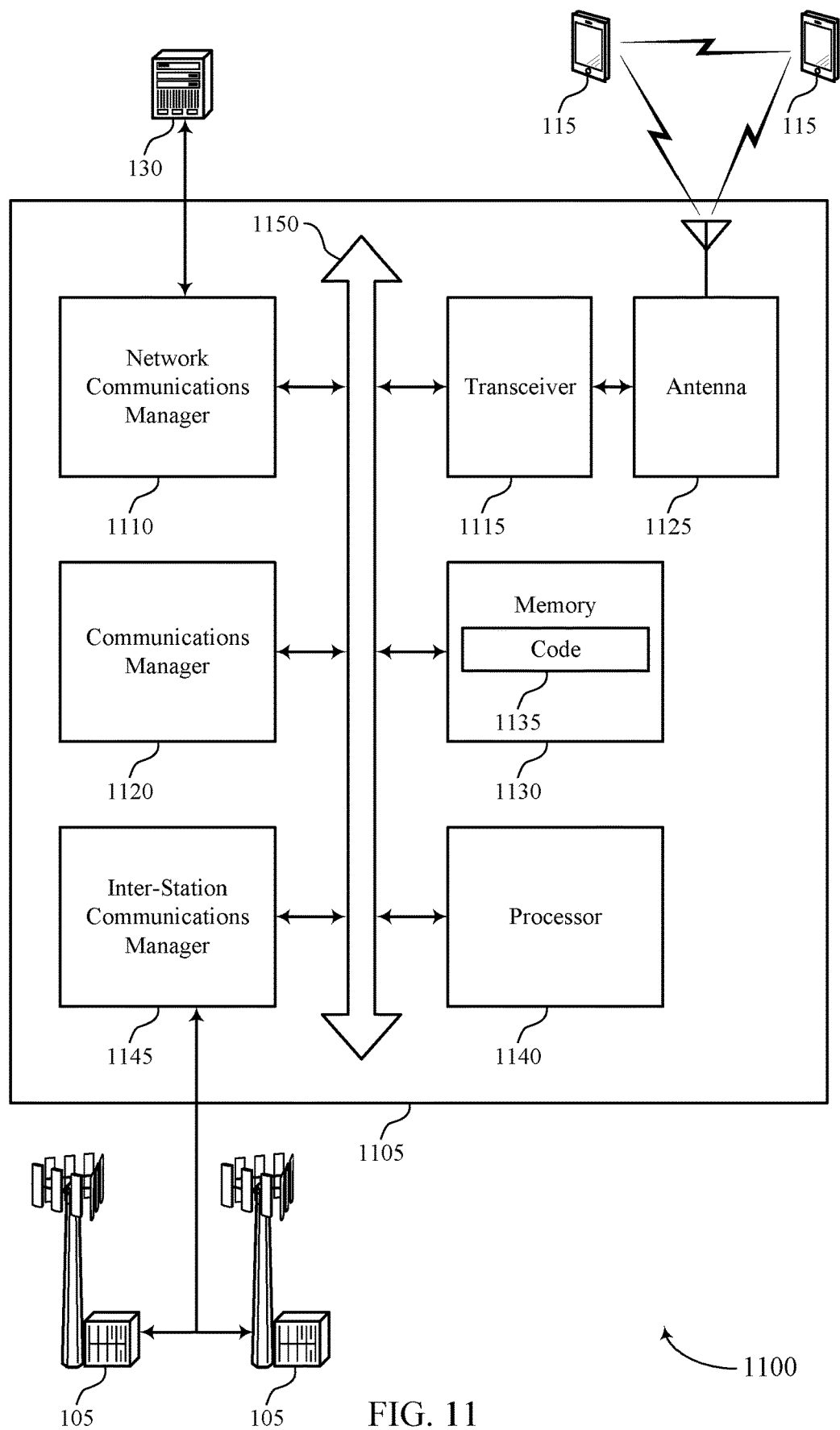
FIG. 11 shows a diagram of a system including a device that supports dedicated unicast transmission of satellite location information in accordance with one or more aspects of the present disclosure.

FIG. 11 shows a diagram of a system 1100 including a device 1105 that supports dedicated unicast transmission of satellite location information in accordance with one or more aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting dedicated unicast transmission of satellite location information). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a wireless network node in accordance with examples as disclosed herein. For example, the communications manager 1120 may be configured as or otherwise support a means for transmitting a first satellite location information to a UE via a broadcast message. The communications manager 1120 may be configured as or otherwise support a means for transmitting a second satellite location information to the UE via a unicast message, where both the first satellite location information and the second satellite location information pertain to a same satellite. The communications manager 1120 may be configured as or otherwise support a means for receiving an uplink communication based on at least one of the first satellite location information or the second satellite location information.

By including or configuring the communications manager 1120 in accordance with examples as described herein, the device 1105 may support techniques for communications with high-altitude vehicles (e.g., satellites or other non-terrestrial-based equipment), user terminals, and base stations, in non-terrestrial networks. Further, implementations may support more efficient utilization of communication resources and, in some examples, may promote higher reliability and reduced power consumption for user terminals in non-terrestrial networks compared to terrestrial networks.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of dedicated unicast transmission of satellite location information as described herein, or the processor 1140 and the memory 1130 may be otherwise configured to perform or support such operations.

Figure 12:
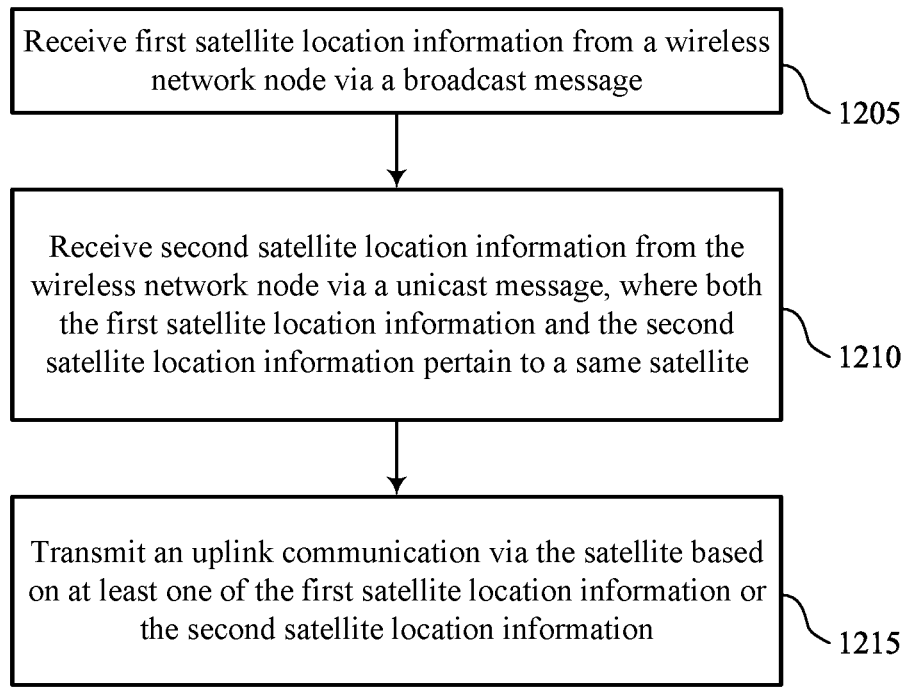
FIGS. 12 through 17 show flowcharts illustrating methods that support dedicated unicast transmission of satellite location information in accordance with one or more aspects of the present disclosure.

FIG. 12 shows a flowchart illustrating a method 1200 that supports dedicated unicast transmission of satellite location information in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving first satellite location information from a wireless network node via a broadcast message. The operations of 1205 may be performed in accordance with examples as disclosed herein. In some examples, aspects of the operations of 1205 may be performed by a broadcast location information manager 625 as described with reference to FIG. 6.

At 1210, the method may include receiving second satellite location information from the wireless network node via a unicast message, where both the first satellite location information and the second satellite location information pertain to a same satellite. The operations of 1210 may be performed in accordance with examples as disclosed herein. In some examples, aspects of the operations of 1210 may be performed by a unicast location information manager 630 as described with reference to FIG. 6.

At 1215, the method may include transmitting an uplink communication via the satellite based on at least one of the first satellite location information or the second satellite location information. The operations of 1215 may be performed in accordance with examples as disclosed herein. In some examples, aspects of the operations of 1215 may be performed by a compensation component 635 as described with reference to FIG. 6.

Figure 13:
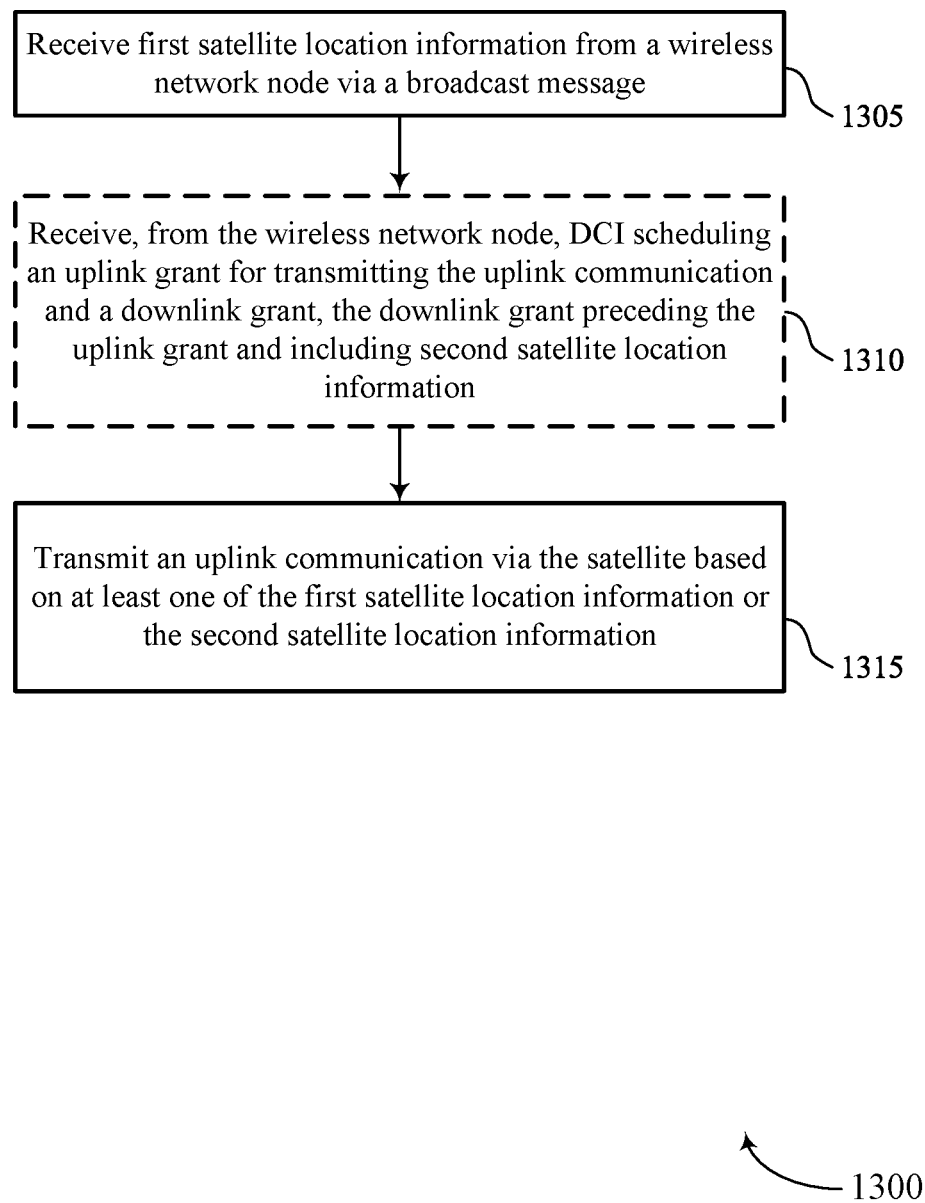

FIG. 13 shows a flowchart illustrating a method 1300 that supports dedicated unicast transmission of satellite location information in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving first satellite location information from a wireless network node via a broadcast message. The operations of 1305 may be performed in accordance with examples as disclosed herein. In some examples, aspects of the operations of 1305 may be performed by a broadcast location information manager 625 as described with reference to FIG. 6.

At 1310, the method may optionally include receiving, from the wireless network node, DCI scheduling an uplink grant for transmitting the uplink communication and a downlink grant, the downlink grant preceding the uplink grant and including the second satellite location information. The operations of 1310 may be performed in accordance with examples as disclosed herein. In some examples, aspects of the operations of 1310 may be performed by a unicast location information manager 630 as described with reference to FIG. 6.

At 1315, the method may include transmitting an uplink communication via the satellite based on at least one of the first satellite location information or the second satellite location information. The operations of 1315 may be performed in accordance with examples as disclosed herein. In some examples, aspects of the operations of 1315 may be performed by a compensation component 635 as described with reference to FIG. 6.

Figure 14:
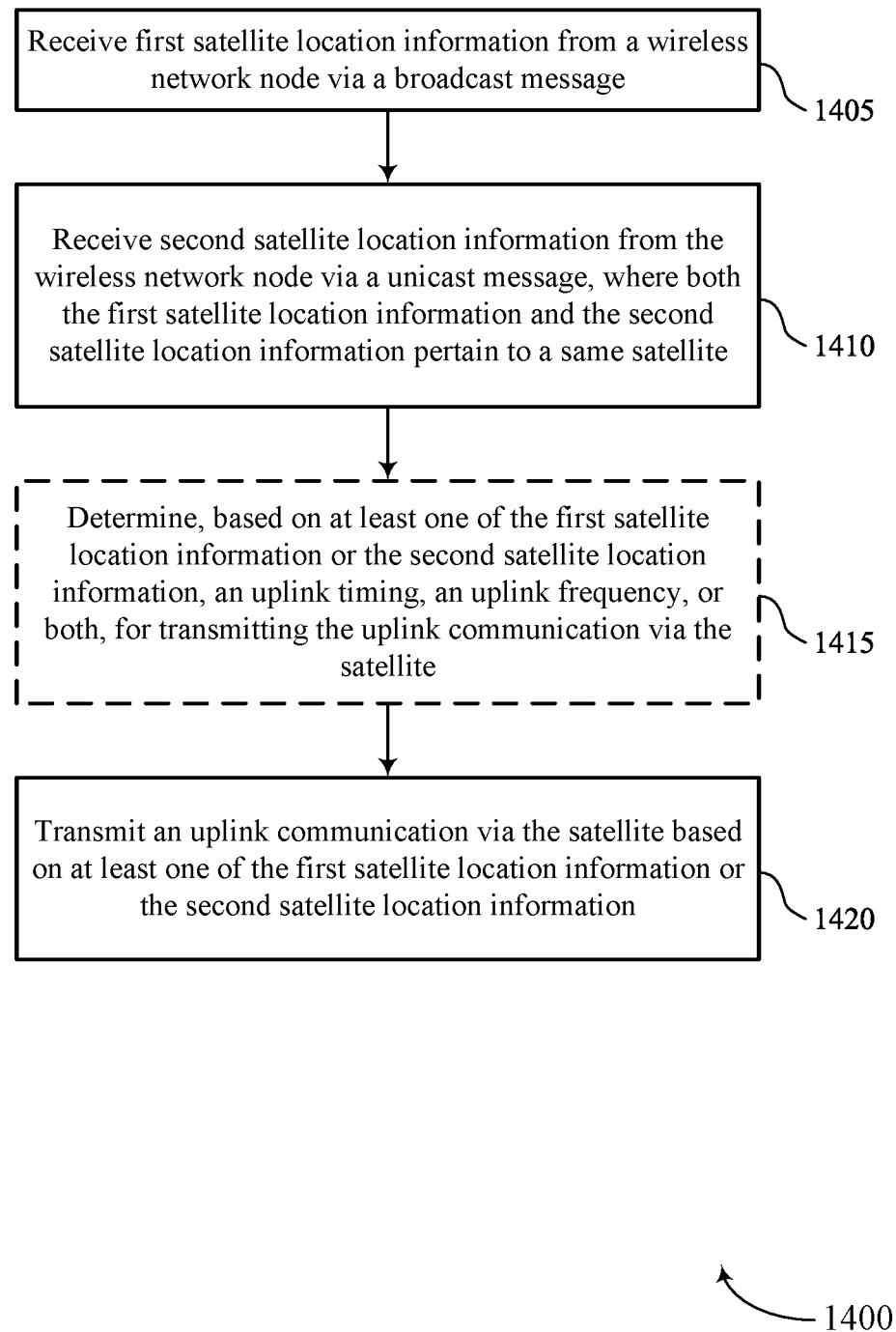

FIG. 14 shows a flowchart illustrating a method 1400 that supports dedicated unicast transmission of satellite location information in accordance with one or more aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving first satellite location information from a wireless network node via a broadcast message. The operations of 1405 may be performed in accordance with examples as disclosed herein. In some examples, aspects of the operations of 1405 may be performed by a broadcast location information manager 625 as described with reference to FIG. 6.

At 1410, the method may include receiving second satellite location information from the wireless network node via a unicast message, where both the first satellite location information and the second satellite location information pertain to a same satellite. The operations of 1410 may be performed in accordance with examples as disclosed herein. In some examples, aspects of the operations of 1410 may be performed by a unicast location information manager 630 as described with reference to FIG. 6.

At 1415, the method may optionally include determining, based on at least one of the first satellite location information or the second satellite location information, an uplink timing, an uplink frequency, or both, for transmitting the uplink communication via the satellite. The operations of 1415 may be performed in accordance with examples as disclosed herein. In some examples, aspects of the operations of 1415 may be performed by a compensation component 635 as described with reference to FIG. 6.

At 1420, the method may include transmitting an uplink communication via the satellite based on at least one of the first satellite location information or the second satellite location information. The operations of 1420 may be performed in accordance with examples as disclosed herein. In some examples, aspects of the operations of 1420 may be performed by a compensation component 635 as described with reference to FIG. 6.

Figure 15:
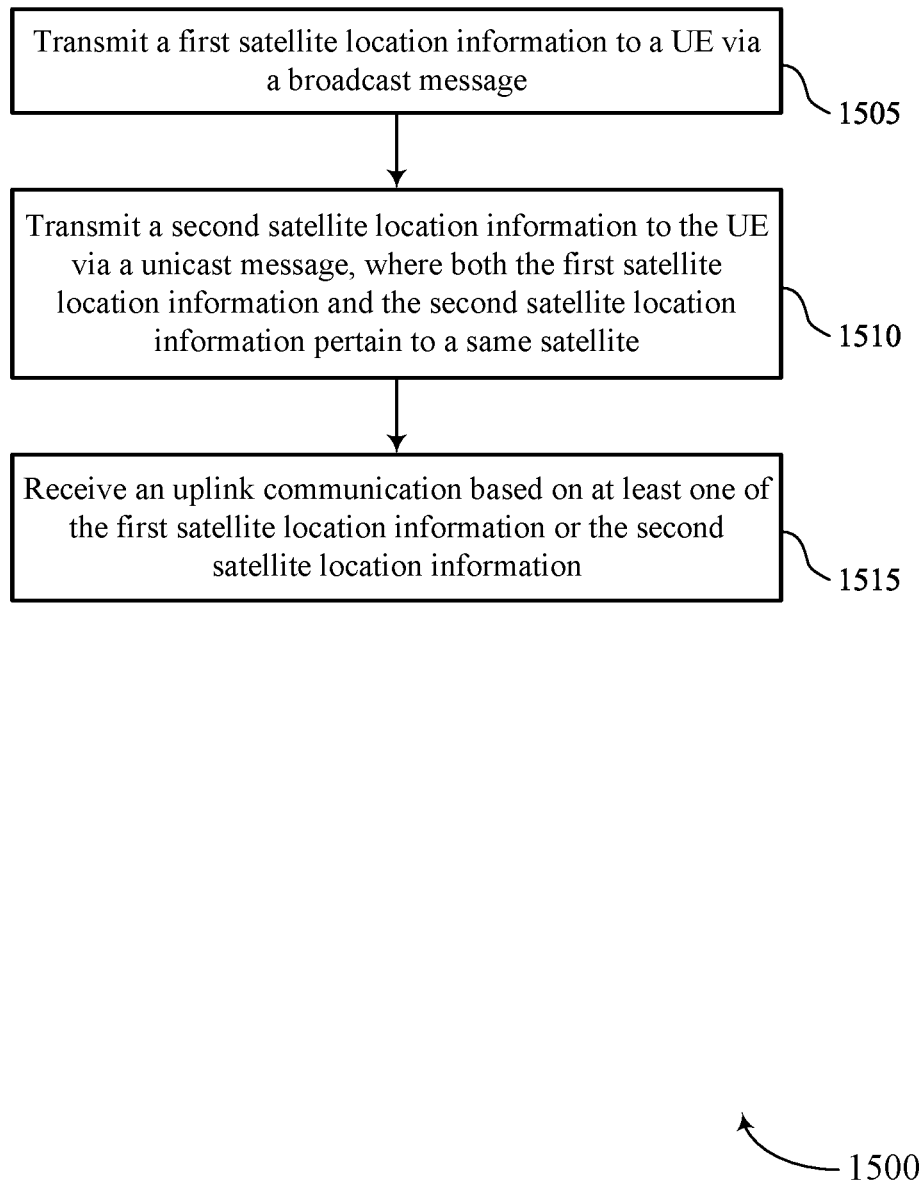

FIG. 15 shows a flowchart illustrating a method 1500 that supports dedicated unicast transmission of satellite location information in accordance with one or more aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting a first satellite location information to a UE via a broadcast message. The operations of 1505 may be performed in accordance with examples as disclosed herein. In some examples, aspects of the operations of 1505 may be performed by a broadcast transmission component 1025 as described with reference to FIG. 10.

At 1510, the method may include transmitting a second satellite location information to the UE via a unicast message, where both the first satellite location information and the second satellite location information pertain to a same satellite. The operations of 1510 may be performed in accordance with examples as disclosed herein. In some examples, aspects of the operations of 1510 may be performed by a unicast transmission component 1030 as described with reference to FIG. 10.

At 1515, the method may include receiving an uplink communication based on at least one of the first satellite location information or the second satellite location information. The operations of 1515 may be performed in accordance with examples as disclosed herein. In some examples, aspects of the operations of 1515 may be performed by an uplink communications component 1035 as described with reference to FIG. 10.

Figure 16:
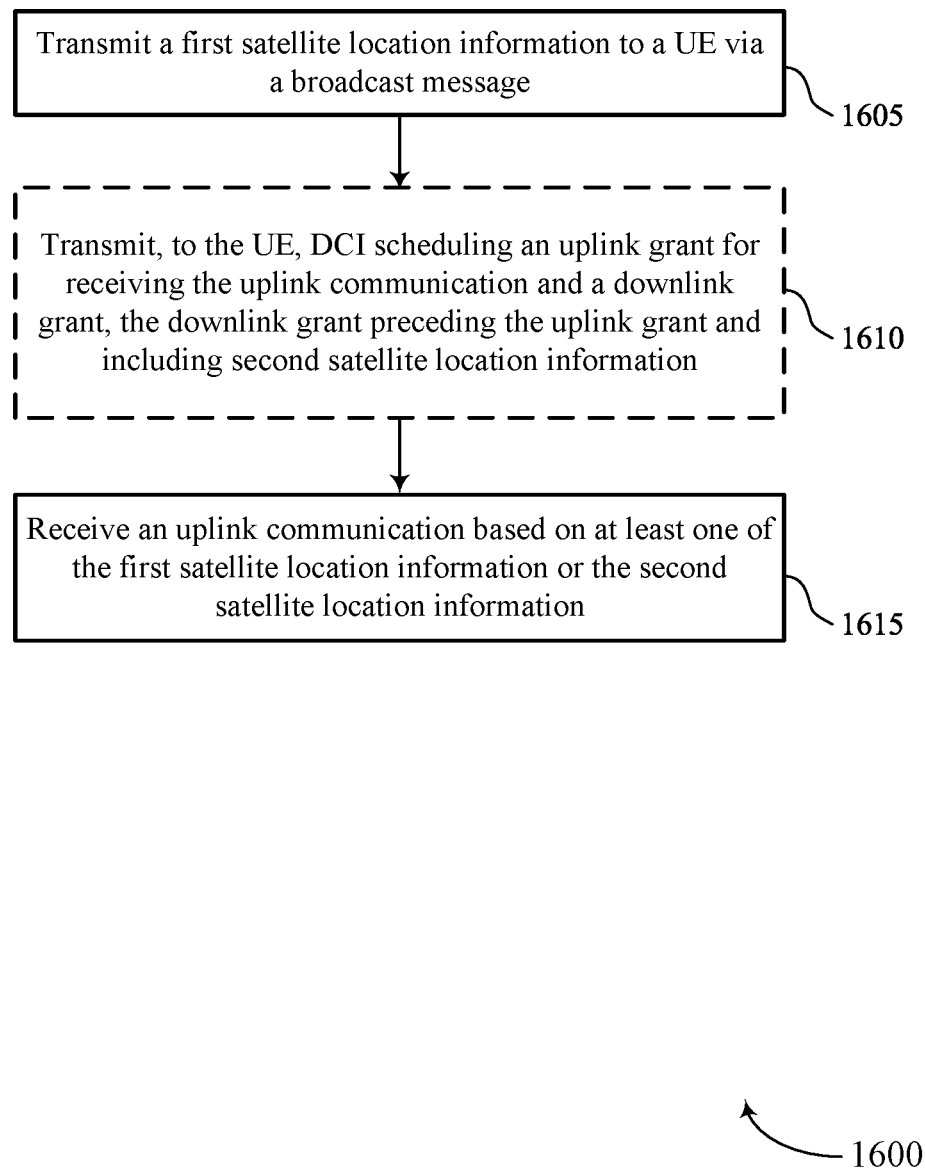

FIG. 16 shows a flowchart illustrating a method 1600 that supports dedicated unicast transmission of satellite location information in accordance with one or more aspects of the present disclosure. The operations of the method 1600 may be implemented by a base station or its components as described herein. For example, the operations of the method 1600 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1605, the method may include transmitting a first satellite location information to a UE via a broadcast message. The operations of 1605 may be performed in accordance with examples as disclosed herein. In some examples, aspects of the operations of 1605 may be performed by a broadcast transmission component 1025 as described with reference to FIG. 10.

At 1610, the method may include transmitting, to the UE, DCI scheduling an uplink grant for receiving the uplink communication and a downlink grant, the downlink grant preceding the uplink grant and including the second satellite location information. The operations of 1610 may be performed in accordance with examples as disclosed herein. In some examples, aspects of the operations of 1610 may be performed by a unicast transmission component 1030 as described with reference to FIG. 10.

At 1615, the method may include receiving an uplink communication based on at least one of the first satellite location information or the second satellite location information. The operations of 1615 may be performed in accordance with examples as disclosed herein. In some examples, aspects of the operations of 1615 may be performed by an uplink communications component 1035 as described with reference to FIG. 10.

At 1620, the method may include receiving an uplink communication based on at least one of the first satellite location information or the second satellite location information. The operations of 1620 may be performed in accordance with examples as disclosed herein. In some examples, aspects of the operations of 1620 may be performed by an uplink communication component 1035 as described with reference to FIG. 10.

Figure 17:
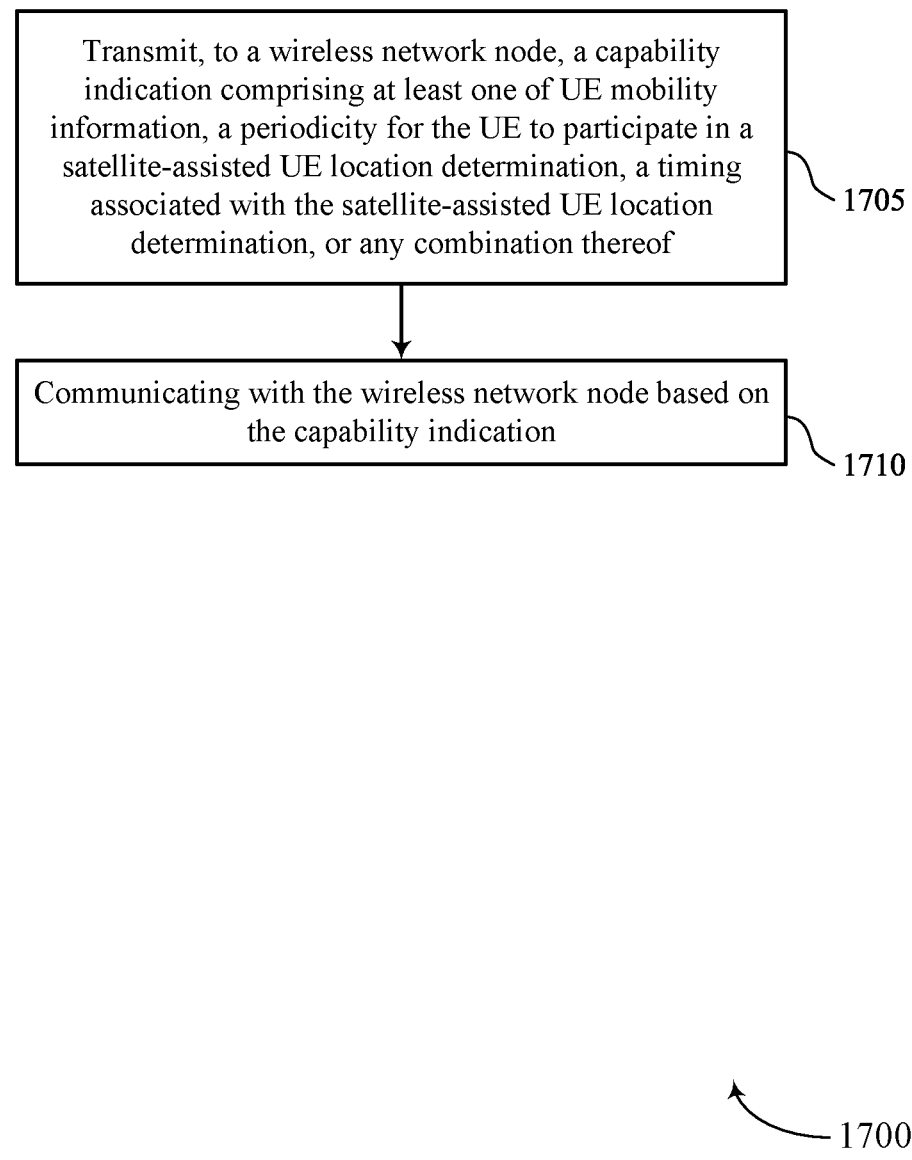

FIG. 17 shows a flowchart illustrating a method 1700 that supports dedicated unicast transmission of satellite location information in accordance with aspects of the present disclosure. The operations of the method 1700 may be implemented by a UE or its components as described herein. For example, the operations of the method 1700 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1705, the method may include transmitting, to a wireless network node, a capability indication including at least one of UE mobility information, a periodicity for the UE to participate in a satellite-assisted UE location determination, a timing associated with the satellite-assisted UE location determination, or any combination thereof. The operations of 1705 may be performed in accordance with examples as disclosed herein. In some examples, aspects of the operations of 1705 may be performed by a UE capability manager 640 as described with reference to FIG. 6.

At 1710, the method may include receiving, from the wireless network node, satellite location information based on the capability indication. The operations of 1710 may be performed in accordance with examples as disclosed herein. In some examples, aspects of the operations of 1710 may be performed by a UE location information manager 645 as described with reference to FIG. 6.

The following provides an overview of aspects of the present disclosure:

Aspect 1: A method for wireless communication at a UE, comprising: receiving first satellite location information from a wireless network node via a broadcast message; receiving second satellite location information from the wireless network node via a unicast message, wherein both the first satellite location information and the second satellite location information pertain to a same satellite; and transmitting an uplink communication via the satellite based at least in part on at least one of the first satellite location information or the second satellite location information.

Aspect 2: The method of aspect 1, the receiving the second satellite location information comprising: receiving the second satellite location information during a connection setup procedure with the wireless network node.

Aspect 3: The method of any of aspects 1 through 2, further comprising: receiving, from the wireless network node, downlink control information scheduling a physical downlink shared channel that includes the second satellite location information.

Aspect 4: The method of any of aspects 1 through 3, further comprising: receiving, from the wireless network node, downlink control information scheduling an uplink grant for transmitting the uplink communication and a downlink grant, the downlink grant preceding the uplink grant and including the second satellite location information.

Aspect 5: The method of any of aspects 1 through 4, the receiving the second satellite location information comprising: receiving, from the wireless network node, downlink control information including the second satellite location information.

Aspect 6: The method of any of aspects 1 through 5, the receiving the second satellite location information comprising: receiving the second satellite location information via a configured grant or a semi-persistent scheduling downlink grant, or both.

Aspect 7: The method of any of aspects 1 through 6, the receiving the second satellite location information comprising: receiving the second satellite location information via a preconfigured uplink resource configuration message.

Aspect 8: The method of any of aspects 1 through 7, further comprising: transmitting a preconfigured uplink resource message, the receiving the second satellite location information comprising receiving the second satellite location information in response to transmitting the preconfigured uplink resource message.

Aspect 9: The method of any of aspects 1 through 8, further comprising: determining, based at least in part on at least one of the first satellite location information or the second satellite location information, an uplink timing, an uplink frequency, or both, for transmitting the uplink communication via the satellite.

Aspect 10: The method of aspect 9, further comprising: determining that the UE is in an idle mode, wherein the uplink timing, the uplink frequency, or both are determined based at least in part on the first satellite location information.

Aspect 11: The method of any of aspects 9 through 10, further comprising: determining that the UE is in a connected mode, wherein the uplink timing, the uplink frequency, or both are determined based at least in part on the second satellite location information.

Aspect 12: The method of any of aspects 9 through 11, further comprising: determining whether to use the first satellite location information or the second satellite location information to determine the uplink timing, the uplink frequency, or both based at least in part on one or more of an accuracy of the first satellite location information, an accuracy of the second satellite location information, a timing of the first satellite location information, a timing of the second satellite location information, or a combination thereof.

Aspect 13: The method of any of aspects 1 through 12, wherein the wireless network node comprises a base station or the satellite.

Aspect 14: The method of any of aspects 1 through 13, wherein the UE comprises an internet of things UE or an enhanced machine-type communication UE.

Aspect 15: A method for wireless communication at a wireless network node, comprising: transmitting a first satellite location information to a UE via a broadcast message; transmitting a second satellite location information to the UE via a unicast message, wherein both the first satellite location information and the second satellite location information pertain to a same satellite; and receiving an uplink communication based at least in part on at least one of the first satellite location information or the second satellite location information.

Aspect 16: The method of aspect 15, the transmitting the second satellite location information comprising: transmitting the second satellite location information during a connection setup procedure with the UE.

Aspect 17: The method of any of aspects 15 through 16, further comprising: transmitting, to the UE, downlink control information scheduling a physical downlink shared channel that includes the second satellite location information.

Aspect 18: The method of any of aspects 15 through 17, further comprising: transmitting, to the UE, downlink control information scheduling an uplink grant for receiving the uplink communication and a downlink grant, the downlink grant preceding the uplink grant and including the second satellite location information.

Aspect 19: The method of any of aspects 15 through 18, the transmitting the second satellite location information comprising: transmitting, to the UE, downlink control information including the second satellite location information.

Aspect 20: The method of any of aspects 15 through 19, the transmitting the second satellite location information comprising: transmitting the second satellite location information via a periodic configured grant, or a semi-persistent scheduling downlink grant, or both.

Aspect 21: The method of any of aspects 15 through 20, the transmitting the second satellite location information comprising: transmitting the second satellite location information via a preconfigured uplink resource configuration message.

Aspect 22: The method of any of aspects 15 through 21, further comprising: receiving a preconfigured uplink resource message, the transmitting the second satellite location information comprising transmitting the second satellite location information in response to receiving the preconfigured uplink resource message.

Aspect 23: The method of any of aspects 15 through 22, wherein receiving the uplink communication is further based at least in part on an uplink timing, an uplink frequency or both determined based at least in part on the first satellite location information or the second satellite location information.

Aspect 24: A method for wireless communication at a UE, comprising: transmitting, to a wireless network node, a capability indication comprising at least one of UE mobility information, a periodicity for the UE to participate in a satellite-assisted UE location determination, a timing associated with the satellite-assisted UE location determination, or any combination thereof; and communicating with the wireless network node based at least in part on the capability indication.

Aspect 25: The method of aspect 24, wherein the capability indication is transmitted as part of a UE capability message.

Aspect 26: The method of any of aspects 24 through 25, wherein the UE mobility information indicates that the UE is a fixed UE or a mobile UE.

Aspect 27: The method of any of aspects 24 through 26, wherein the UE comprises an internet of things UE or an enhanced machine-type communication UE.

Aspect 28: The method of any of aspects 24 through 27, wherein the satellite-assisted UE location determination is based at least in part on a global navigation satellite system or a global positioning system or both; and the wireless network node comprises a serving satellite or a serving base station in a non-terrestrial network.

Aspect 29: An apparatus for wireless communication at a UE, comprising a processor; memory coupled with the processor, the processor and memory configured to perform a method of any of aspects 1 through 14.

Aspect 30: An apparatus for wireless communication at a UE, comprising at least one means for performing a method of any of aspects 1 through 14.

Aspect 31: A non-transitory computer-readable medium storing code for wireless communication at a UE, the code comprising instructions executable by a processor to perform a method of any of aspects 1 through 14.

Aspect 32: An apparatus for wireless communication at a wireless network node, comprising a processor; memory coupled with the processor, the processor and memory configured to perform a method of any of aspects 15 through 23.

Aspect 33: An apparatus for wireless communication at a wireless network node, comprising at least one means for performing a method of any of aspects 15 through 23.

Aspect 34: A non-transitory computer-readable medium storing code for wireless communication at a wireless network node, the code comprising instructions executable by a processor to perform a method of any of aspects 15 through 23.

Aspect 35: An apparatus for wireless communication at a UE, comprising a processor; memory coupled with the processor, the processor and memory configured to perform a method of any of aspects 24 through 28.

Aspect 36: An apparatus for wireless communication at a UE, comprising at least one means for performing a method of any of aspects 24 through 28.

Aspect 37: A non-transitory computer-readable medium storing code for wireless communication at a UE, the code comprising instructions executable by a processor to perform a method of any of aspects 24 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, at a first time and from a wireless network node, first location information for a satellite via a broadcast message;
   receiving, at a second time after the first time and from the wireless network node, second location information for the satellite via a dedicated unicast message, wherein the dedicated unicast message is dedicated for the UE; and
   transmitting, in accordance with a pre-compensation factor and an uplink frequency that are determined using the second location information received via the dedicated unicast message, an uplink communication via the satellite.

2. The method of claim 1, the receiving the second location information for the satellite comprising:
   receiving the second location information for the satellite during a connection setup procedure with the wireless network node.

3. The method of claim 1, further comprising:
   receiving, from the wireless network node, downlink control information scheduling a physical downlink shared channel that includes the second location information for the satellite.

4. The method of claim 1, further comprising:
   receiving, from the wireless network node, a downlink grant and downlink control information scheduling an uplink grant for transmitting the uplink communication, the downlink grant preceding the uplink grant and including the second location information for the satellite.

5. The method of claim 1, the receiving the second location information for the satellite comprising:
   receiving, from the wireless network node, downlink control information including the second location information for the satellite.

6. The method of claim 1, the receiving the second location information for the satellite comprising:

receiving the second location information for the satellite via a configured grant or a semi-persistent scheduling downlink grant, or both.

7. The method of claim 1, the receiving the second location information for the satellite comprising:
receiving the second location information for the satellite via a preconfigured uplink resource configuration message.

8. The method of claim 1, further comprising:
transmitting a preconfigured uplink resource message, wherein the second location information for the satellite is received in response to transmitting the preconfigured uplink resource message.

9. The method of claim 1, further comprising:
determining, based at least in part on the second location information for the satellite, an uplink timing, for transmitting the uplink communication via the satellite.

10. The method of claim 9, further comprising:
determining that the UE is in a connected mode, wherein the uplink timing, the uplink frequency, or both are determined using the second location information for the satellite based at least in part on the UE being in the connected mode.

11. The method of claim 1, wherein the wireless network node comprises a network device or the satellite.

12. The method of claim 1, wherein the UE comprises an internet of things UE or an enhanced machine-type communication UE.

13. A method for wireless communication at a wireless network node, comprising:
transmitting, at a first time and to a user equipment (UE), first location information for a satellite via a broadcast message;
transmitting, at a second time after the first time and to the UE, second location information for the satellite via a dedicated unicast message, wherein the dedicated unicast message is dedicated for the UE; and
receiving, in accordance with a pre-compensation factor and an uplink frequency that are determined using the second location information transmitted via the dedicated unicast message, an uplink communication.

14. The method of claim 13, the transmitting the second location information for the satellite comprising:
transmitting the second location information for the satellite during a connection setup procedure with the UE.

15. The method of claim 13, further comprising:
transmitting, to the UE, downlink control information scheduling a physical downlink shared channel that includes the second location information for the satellite.

16. The method of claim 13, further comprising:
transmitting, to the UE, a downlink grant and downlink control information scheduling an uplink grant for receiving the uplink communication, the downlink grant preceding the uplink grant and including the second location information for the satellite.

17. The method of claim 13, the transmitting the second location information for the satellite comprising:
transmitting, to the UE, downlink control information including the second location information for the satellite.

18. The method of claim 13, the transmitting the second location information for the satellite comprising:
transmitting the second location information for the satellite via a periodic configured grant, or a semi-persistent scheduling downlink grant, or both.

19. The method of claim 13, the transmitting the second location information for the satellite comprising:
transmitting the second location information for the satellite via a preconfigured uplink resource configuration message.

20. The method of claim 13, further comprising:
receiving a preconfigured uplink resource message, wherein the second location information for the satellite is transmitted in response to receiving the preconfigured uplink resource message.

21. The method of claim 13, wherein receiving the uplink communication is further based at least in part on an uplink timing determined based at least in part on the second location information for the satellite.

22. A method for wireless communication at a user equipment (UE), comprising:
transmitting, to a wireless network node, a capability indication comprising UE mobility information comprising an indication that the UE is a fixed UE or a mobile UE, a periodicity for the UE to participate in a satellite-assisted UE location determination, and a timing associated with the satellite-assisted UE location determination; and
communicating with the wireless network node based at least in part on the capability indication.

23. The method of claim 22, wherein the capability indication is transmitted as part of a UE capability message.

24. The method of claim 22, wherein the UE comprises an internet of things UE or an enhanced machine-type communication UE.

25. The method of claim 22, wherein:
the satellite-assisted UE location determination is based at least in part on a global navigation satellite system or a global positioning system or both; and
the wireless network node comprises a serving satellite or a serving network entity in a non-terrestrial network.

26. An apparatus for wireless communication at a user equipment (UE), comprising:
a processor; and
memory coupled with the processor, the processor configured to:
receive, at a first time and from a wireless network node, first location information for a satellite via a broadcast message;
receive, at a second time after the first time and from the wireless network node, second location information for the satellite via a dedicated unicast message, wherein the dedicated unicast message is dedicated for the UE; and
transmit, in accordance with a pre-compensation factor and an uplink frequency that are determined using the second location information received via the dedicated unicast message, an uplink communication via the satellite.

27. The apparatus of claim 26, wherein the apparatus further comprises an antenna, and wherein the processor and antenna are further configured to:
receive, from the wireless network node, downlink control information that schedules a physical downlink shared channel that includes the second location information for the satellite.

28. The apparatus of claim 26, wherein the processor is further configured to:
receive, from the wireless network node, downlink control information scheduling a physical downlink shared channel that includes the second location information for the satellite.

29. An apparatus for wireless communication at a wireless network node, comprising:
a processor; and
memory coupled with the processor, the processor configured to:
transmit, at a first time and to a user equipment (UE), first location information for a satellite via a broadcast message;
transmit, at a second time after the first time and to the UE, second location information for the satellite via a dedicated unicast message, wherein the dedicated unicast message is dedicated for the UE; and
receive, in accordance with a pre-compensation factor and an uplink frequency that are determined using the second location information transmitted via the dedicated unicast message, an uplink communication via the satellite.

30. The apparatus of claim 29, wherein the processor is further configured to:
transmit the second location information for the satellite during a connection setup procedure with the UE.

31. The apparatus of claim 29, wherein the processor is further configured to:
transmit, to the UE, downlink control information scheduling a physical downlink shared channel that includes the second location information for the satellite.

32. An apparatus for wireless communication at a user equipment (UE), comprising:
a processor; and
memory coupled with the processor, the processor configured to:
transmit, to a wireless network node, a capability indication comprising UE mobility information comprising a periodicity for the UE to participate in a satellite-assisted UE location determination, and a timing associated with the satellite-assisted UE location determination; and
communicate with the wireless network node based at least in part on the capability indication.

33. The apparatus of claim 32, wherein the capability indication is transmitted as part of a UE capability message.

34. A non-transitory computer-readable medium storing code for wireless communication at a user equipment (UE), the code comprising instructions executable by a processor to:
receive, at a first time and from a wireless network node, first location information for a satellite via a broadcast message;
receive, at a second time after the first time and from the wireless network node, second location information for the satellite via a dedicated unicast message, wherein the dedicated unicast message is dedicated for the UE; and
transmit, in accordance with a pre-compensation factor and an uplink frequency that are determined using the second location information received via the dedicated unicast message, an uplink communication via the satellite.

35. The non-transitory computer-readable medium of claim 34, wherein the instructions are further executable by the processor to:
receive the second location information for the satellite during a connection setup procedure with the wireless network node.

36. The non-transitory computer-readable medium of claim 34, wherein the instructions are further executable by the processor to:
receive, from the wireless network node, downlink control information scheduling a physical downlink shared channel that includes the second location information for the satellite.

37. A non-transitory computer-readable medium storing code for wireless communication at a wireless network node, the code comprising instructions executable by a processor to:
transmit, at a first time and to a user equipment (UE), first location information for a satellite via a broadcast message;
transmit, at a second time after the first time and to the UE, second location information for the satellite via a dedicated unicast message, wherein the dedicated unicast message is dedicated for the UE; and
receive, in accordance with a pre-compensation factor and an uplink frequency that are determined using the second location information transmitted via the dedicated unicast message, an uplink communication via the satellite.

38. The non-transitory computer-readable medium of claim 37, wherein the instructions are further executable by the processor to:
transmit the second location information for the satellite during a connection setup procedure with the UE.

39. The non-transitory computer-readable medium of claim 37, wherein the instructions are further executable by the processor to:
transmit, to the UE, downlink control information scheduling a physical downlink shared channel that includes the second location information for the satellite.

40. A non-transitory computer-readable medium storing code for wireless communication at a user equipment (UE), the code comprising instructions executable by a processor to:
transmit, to a wireless network node, a capability indication comprising UE mobility information comprising a periodicity for the UE to participate in a satellite-assisted UE location determination, and a timing associated with the satellite-assisted UE location determination; and
communicate with the wireless network node based at least in part on the capability indication.

41. The non-transitory computer-readable medium of claim 40, wherein the capability indication is transmitted as part of a UE capability message.

* * * * *